US010891050B2

(12) United States Patent
Zarraga et al.

(10) Patent No.: US 10,891,050 B2
(45) Date of Patent: Jan. 12, 2021

(54) METHOD AND APPARATUS FOR VARIABLE IMPEDANCE TOUCH SENSOR ARRAYS IN NON-PLANAR CONTROLS

(71) Applicant: Sensel, Inc., Sunnyvale, CA (US)

(72) Inventors: John Aaron Zarraga, San Francisco, CA (US); Alexander Meagher Grau, Durham, NC (US); Bethany Noel Haniger, Los Gatos, CA (US); Bradley James Bozarth, Moore, SC (US); Brogan Carl Miller, Mountain View, CA (US); Ilya Daniel Rosenberg, Mountain View, CA (US); James Frank Thomas, Danville, CA (US); Mark Joshua Rosenberg, Sunnyvale, CA (US); Peter Hans Nyboer, San Jose, CA (US); Reuben Eric Martinez, Gilroy, CA (US); Scott Gregory Isaacson, Mountain View, CA (US); Stephanie Jeanne Oberg, Sunnyvale, CA (US); Timothy James Miller, Half Moon Bay, CA (US); Tomer Moscovich, San Francisco, CA (US); Yibo Yu, Santa Clara, CA (US)

(73) Assignee: SENSEL, INC., Sunnyvale, CA (US)

( * ) Notice: Subject to any disclaimer, the term of this patent is extended or adjusted under 35 U.S.C. 154(b) by 0 days.

(21) Appl. No.: 16/568,691

(22) Filed: Sep. 12, 2019

(65) Prior Publication Data

US 2020/0089400 A1 Mar. 19, 2020

Related U.S. Application Data

(60) Provisional application No. 62/730,762, filed on Sep. 13, 2018.

(51) Int. Cl.
*G06F 3/0488* (2013.01)
*G06F 3/041* (2006.01)
(Continued)

(52) U.S. Cl.
CPC .......... *G06F 3/04883* (2013.01); *G01L 1/146* (2013.01); *G01L 1/20* (2013.01);
(Continued)

(58) Field of Classification Search
None
See application file for complete search history.

(56) References Cited

U.S. PATENT DOCUMENTS 9,459,746 B2 10/2016 Rosenberg et al.
9,465,477 B2 10/2016 Rosenberg et al.
(Continued)

OTHER PUBLICATIONS

Non-Final Office Action received for U.S. Appl. No. 16/384,331 dated Apr. 16, 2020, 30 pages.
(Continued)

*Primary Examiner* — Aneeta Yodichkas
(74) *Attorney, Agent, or Firm* — Amin, Turocy & Watson, LLP

(57) ABSTRACT

The present invention relates to touch sensor detectors incorporating interpolated variable impedance touch sensor arrays and specifically to detectors for non-planar touch controls. Variable impedance touch sensor arrays are applied to the surface of objects, inside objects, or other objects such that touches are detected directly or indirectly from the non-planar touch controls. An exemplary system includes a plurality of sensor panels on a plurality of device and a processor communicatively coupled to the sensor panels. The sensor panels include a plurality of physical VIA columns connected by interlinked impedance columns and a plurality of physical VIA rows connected by interlinked (Continued)

impedance rows. The processor detects touches at a first time at the sensor panels, determines that the two or more touches at the first time are arranged in a pattern corresponding to a predetermined gesture, and determines a relative pressure between the two or more touches.

19 Claims, 21 Drawing Sheets

(51) Int. Cl.
  *G01L 1/14* (2006.01)
  *G01L 1/20* (2006.01)
(52) U.S. Cl.
  CPC .. *G06F 3/0416* (2013.01); *G06F 2203/04104* (2013.01); *G06F 2203/04105* (2013.01); *G06F 2203/04106* (2013.01); *G06F 2203/04808* (2013.01)

(56) References Cited

U.S. PATENT DOCUMENTS

| | | | |
|---|---|---|---|
| 9,746,964 | B2 | 8/2017 | Rosenberg et al. |
| 9,864,460 | B2 | 1/2018 | Rosenberg et al. |
| 9,864,461 | B2 | 1/2018 | Rosenberg et al. |
| 10,073,565 | B2 | 9/2018 | Rosenberg et al. |
| 10,088,947 | B2 | 10/2018 | Rosenberg et al. |
| 10,254,943 | B2 | 4/2019 | Jubner et al. |
| 2008/0246726 | A1 | 10/2008 | Gettemy |
| 2009/0256817 | A1 | 10/2009 | Perlin et al. |
| 2011/0284304 | A1 | 11/2011 | Van Schoiack |
| 2012/0001861 | A1 | 1/2012 | Townsend et al. |
| 2012/0056837 | A1 | 3/2012 | Park et al. |
| 2013/0307799 | A1 | 11/2013 | Hauf |
| 2014/0071077 | A1 | 3/2014 | Kang |
| 2014/0253440 | A1* | 9/2014 | Karakotsios .......... G06F 1/1692 345/157 |
| 2014/0267100 | A1 | 9/2014 | Sohn et al. |
| 2014/0313163 | A1 | 10/2014 | Coni et al. |
| 2014/0317722 | A1 | 10/2014 | Tartz et al. |
| 2015/0077364 | A1* | 3/2015 | Parthasarathy ......... G06F 3/005 345/173 |
| 2015/0091858 | A1* | 4/2015 | Rosenberg .............. G06F 3/045 345/174 |
| 2015/0091859 | A1 | 4/2015 | Rosenberg et al. |
| 2015/0339001 | A1 | 11/2015 | Zirkl et al. |
| 2016/0313801 | A1* | 10/2016 | Wagner .................. G09B 21/02 |
| 2017/0035329 | A1 | 2/2017 | Gavish |
| 2017/0038910 | A1 | 2/2017 | Lee |
| 2017/0185289 | A1 | 6/2017 | Kim et al. |
| 2017/0285848 | A1 | 10/2017 | Rosenberg et al. |
| 2017/0336891 | A1 | 11/2017 | Rosenberg et al. |
| 2018/0113512 | A1 | 4/2018 | Kang et al. |
| 2019/0079655 | A1* | 3/2019 | Park ...................... G06F 3/0362 |

OTHER PUBLICATIONS

Non-Final Office Action received for U.S. Appl. No. 16/519,319 dated May 18, 2020, 31 pages.
International Search Report and Written Opinion received for PCT Application Serial No. PCT/US2019/068287 dated Apr. 24, 2020, 13 pages.
International Search Report and Written Opinion received for PCT Application Serial No. PCT/US2019/068284 dated Mar. 13, 2020, 08 pages.
Lo et al.,"Bendy: An Exploration into Gaming with Mobile Flexible Devices" In: Carleton University, Feb. 20, 2020, 20 pages.
Non-Final Office Action received for U.S. Appl. No. 16/414,419 dated Jun. 11, 2020, 22 pages.
Final Office Action received for U.S. Appl. No. 16/519,319 dated Sep. 16, 2020, 17 pages.

\* cited by examiner

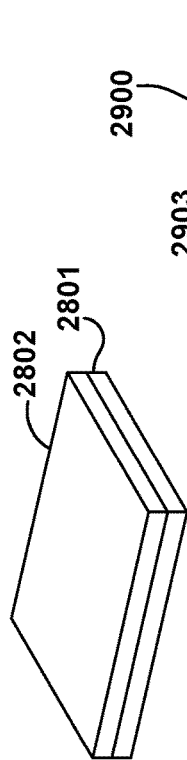
FIG. 29
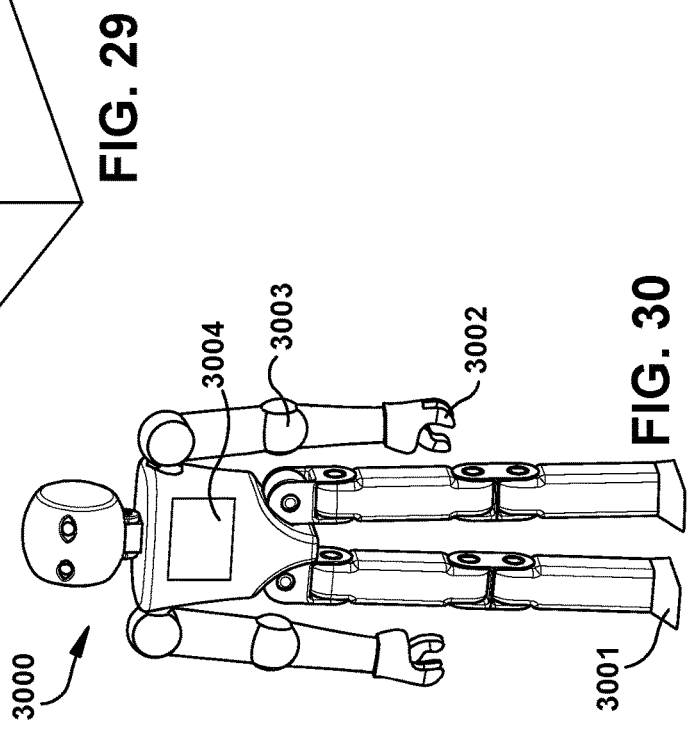
FIG. 28
FIG. 30
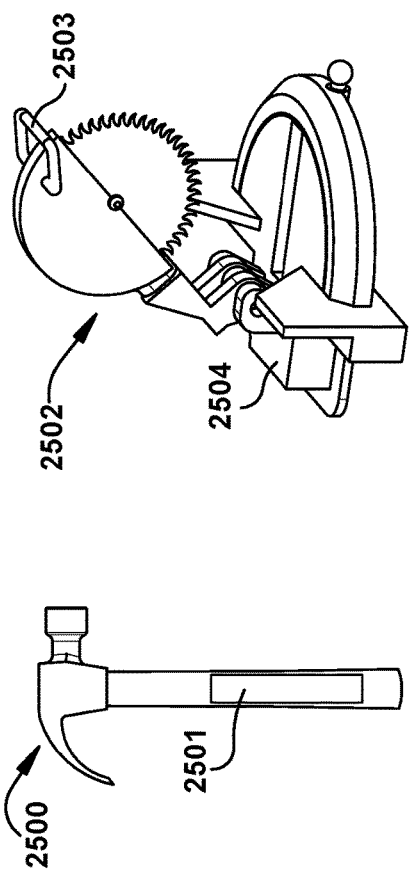
FIG. 25b
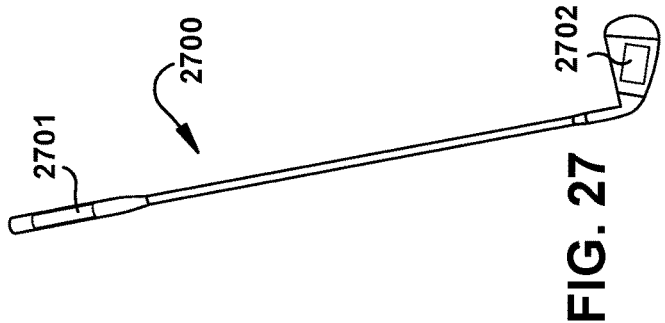
FIG. 27
FIG. 25a
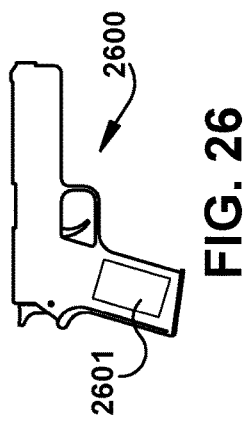
FIG. 26

METHOD AND APPARATUS FOR VARIABLE IMPEDANCE TOUCH SENSOR ARRAYS IN NON-PLANAR CONTROLS

CROSS-REFERENCE TO RELATED APPLICATIONS

This application claims priority to U.S. Provisional Patent Application No. 62/730,762 titled METHOD AND APPARATUS FOR VARIABLE IMPEDANCE TOUCH SENSOR ARRAYS IN NON-PLANAR CONTROLS and filed on Sep. 13, 2018, the disclosure of which is hereby incorporated herein by reference in its entirety.

INTRODUCTION

The present invention relates to touch sensor detector systems and methods incorporating one or more interpolated variable impedance touch sensor array and specifically to such systems and methods for non-planar touch controls. One or more variable impedance touch sensor arrays are applied to the surface of objects, inside objects, or other objects such that touches are detected directly or indirectly from the non-planar touch controls. The systems and methods disclosed herein utilize a touch sensor array configured to detect force and/or object (e.g., digits, pens, brushes, etc.) proximity/contact/pressure via a variable impedance array electrically coupling interlinked impedance columns coupled to an array column driver and interlinked impedance rows coupled to an array row sensor. The array column driver is configured to select the interlinked impedance columns based on a column switching register and electrically drive the interlinked impedance columns using a column driving source. The variable impedance array conveys current from the driven interlinked impedance columns to the interlinked impedance columns sensed by the array row sensor. The array row sensor selects the interlinked impedance rows within the touch sensor array and electrically senses the interlinked impedance rows state based on a row switching register. Interpolation of array row sensor sensed current/voltage allows accurate detection of touch sensor array proximity/contact/pressure and/or spatial location.

The gesture recognition systems and methods using variable impedance array sensors include sensors disclosed in the following applications, the disclosures of which are hereby incorporated by reference in their entirety: U.S. patent application Ser. No. 15/599,365 titled SYSTEM FOR DETECTING AND CONFIRMING A TOUCH INPUT filed on May 18, 2017; U.S. patent application Ser. No. 15/653,856 titled TOUCH SENSOR DETECTOR SYSTEM AND METHOD filed on Jul. 19, 2017; U.S. patent application Ser. No. 15/271,953 titled DIAMOND PATTERNED TOUCH SENSOR SYSTEM AND METHOD filed on Sep. 21, 2016; U.S. patent application Ser. No. 14/499,090 titled CAPACITIVE TOUCH SENSOR SYSTEM AND METHOD filed on Sep. 27, 2014 and issued as U.S. Pat. No. 9,459,746 on Oct. 4, 2016; U.S. patent application Ser. No. 14/499,001 titled RESISTIVE TOUCH SENSOR SYSTEM AND METHOD filed on Sep. 26, 2014 and issued as U.S. Pat. No. 9,465,477 on Oct. 11, 2016; U.S. patent application Ser. No. 15/224,003 titled SYSTEMS AND METHODS FOR MANIPULATING A VIRTUAL ENVIRONMENT filed on Jul. 29, 2016 and issued as U.S. Pat. No. 9,864,461 on Jan. 9, 2018; U.S. patent application Ser. No. 15/223,968 titled SYSTEMS AND METHODS FOR MANIPULATING A VIRTUAL ENVIRONMENT filed on Jul. 29, 2016 and issued as U.S. Pat. No. 9,864,460 on Jan. 9, 2018; U.S. patent application Ser. No. 15/470,669 titled SYSTEM AND METHOD FOR DETECTING AND CHARACTERIZING FORCE INPUTS ON A SURFACE filed on Mar. 27, 2017; and U.S. patent application Ser. No. 15/476,732 titled HUMAN-COMPUTER INTERFACE SYSTEM filed on Oct. 5, 2017.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 25a illustrates a system using an exemplary interpolated variable impedance sensor array for gesture recognition.

FIG. 25b illustrates a system using an exemplary interpolated variable impedance sensor array for gesture recognition.

FIG. 26 illustrates a system using an exemplary interpolated variable impedance sensor array for gesture recognition.

FIG. 27 illustrates a system using an exemplary interpolated variable impedance sensor array for gesture recognition.

FIG. 28 illustrates a system using an exemplary interpolated variable impedance sensor array for gesture recognition.

FIG. 29 illustrates a system using an exemplary interpolated variable impedance sensor array for gesture recognition.

FIG. 30 illustrates a system using an exemplary interpolated variable impedance sensor array for gesture recognition.

DETAILED DESCRIPTION

Figure 1:
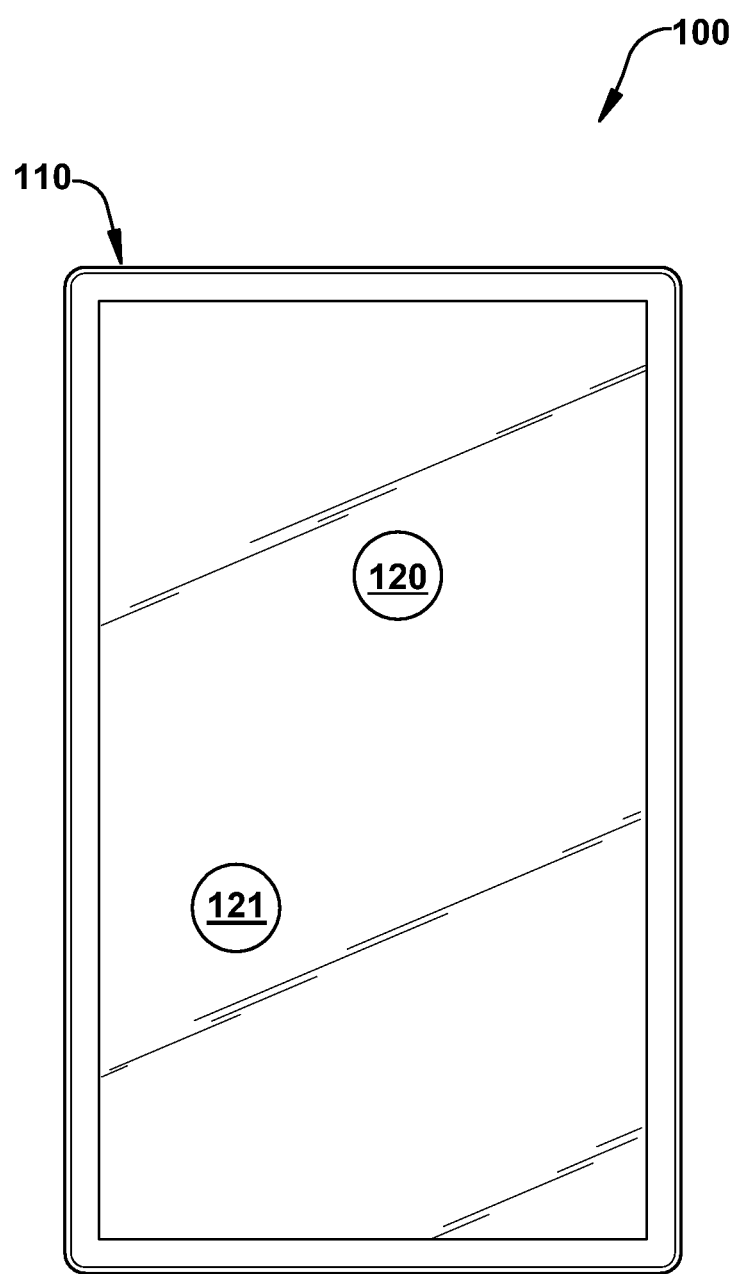
FIG. 1 illustrates a system using an exemplary interpolated variable impedance sensor array for gesture recognition.

The present invention relates to touch sensor detector systems and methods incorporating an interpolated variable impedance touch sensor array and specifically to such systems and methods for non-planar touch controls. One or more variable impedance touch sensor arrays are applied to the surface of objects, inside objects, or other objects such that touches are detected directly or indirectly from non-planar touch controls. The systems and methods disclosed herein utilize a touch sensor array configured to detect proximity/contact/pressure via a variable impedance array electrically coupling interlinked impedance columns coupled to an array column driver and interlinked impedance rows coupled to an array row sensor. The array column driver is configured to select the interlinked impedance columns based on a column switching register and electrically drive the interlinked impedance columns using a column driving source. The variable impedance array conveys current from the driven interlinked impedance columns to the interlinked impedance columns sensed by the array row sensor. The array row sensor selects the interlinked impedance rows within the touch sensor array and electrically senses the interlinked impedance rows state based on a row switching register. Interpolation of array row sensor sensed current/voltage allows accurate detection of touch sensor array proximity/contact/pressure and/or spatial location.

In one embodiment, exemplary methods for receiving an adjustment gesture formed on or about a plurality of sensor panels on a plurality of faces of a device include detecting two or more touches at a first time at the sensor panels and determining that the two or more touches at the first time are arranged in a pattern corresponding to a predetermined gesture. The method further includes determining a relative pressure between the two or more touches, associating the gesture with a user interface (UI) element, the UI element accepting an adjustment input based on the relative pressure between the two or more touches, and providing an input to the UI element based on the gesture and relative pressure between the two or more touches.

In exemplary methods and systems, each of the plurality of sensor panels include a plurality of physical VIA columns connected by interlinked impedance columns and a plurality of physical VIA rows connected by interlinked impedance rows. The sensor panels also include a plurality of column drive sources connected to the interlinked impedance columns and to the plurality of physical VIA columns through the interlinked impedance columns, a plurality of row sense sinks connected to the interlinked impedance rows and to the plurality of physical VIA rows through the interlinked impedance rows, and a processor configured to interpolate a location of the gesture in the physical VIA columns and physical VIA rows from an electrical signal from the plurality of column drive sources sensed at the plurality of row sense sinks.

Another exemplary method for receiving an adjustment gesture formed on or about a plurality of sensor arrays on a plurality of faces of a deice includes determining a touch pattern of one or more points in contact with the plurality of sensor arrays, determining a pressure response pattern at the one or more touch points over time, and determining a gesture corresponding to the touch pattern and the pressure response pattern.

Another exemplary method includes a method for receiving an input for a hand-held device comprising detecting grip pressure at a first and second lateral side of the hand-held device, detecting a touch on the back side of the hand-held device, determining if the grip pressure at the first and second lateral sides of the hand-held device exceeds a rejection value, and rejecting the touch on the back side of the hand-held device if the grip pressure at the first and second lateral sides of the hand-held device does not exceed the rejection value.

An exemplary system includes a plurality of sensor panels on a plurality of faces of a device and a processor communicatively coupled to the plurality of sensor panels. The processor is programmed to detect two or more touches at a first time at the sensor panels, determine that the two or more touches at the first time are arranged in a pattern corresponding to a predetermined gesture, and determine a relative pressure between the two or more touches.

Figure 2:
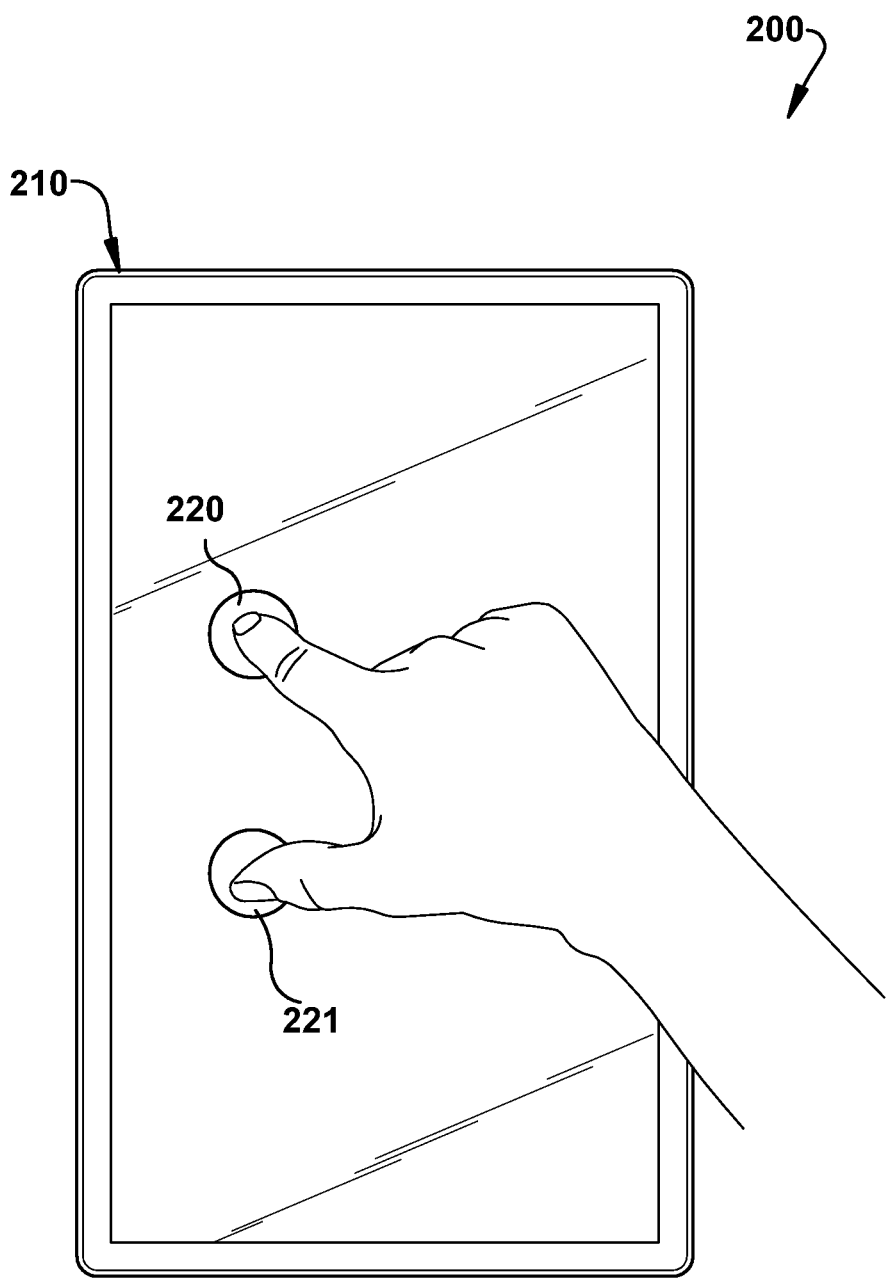
FIG. 2 illustrates a system using an exemplary interpolated variable impedance sensor array for gesture recognition.

FIG. 1 illustrates a handheld system 100 using an exemplary interpolated variable impedance sensor array. FIG. 1 shows a touch interface 110 using the exemplary interpolated variable impedance sensor array. The touch interface 110 is a touchscreen of a handheld computing device 100 with a UI. In one embodiment, a processor communicatively coupled to the sensor array 110 is programmed to receive touch input formed on or about the face of the sensor array 110. The processor may be programmed to detect two or more touches on the sensor array 110. Two exemplary touches 120, 121 are illustrated as circles in FIG. 1. The circles 120, 121 represent points at which a user has contacted the sensor array 110. In one embodiment, the processor is programmed to determine that the two or more touches are arranged in a pattern corresponding to a predetermined pattern. For example, the processor may determine the distance (D) between the two points 120, 121. Whether the distance (D) is greater than or less than some threshold may be used to determine if the touch points 120, 121 correspond to a given pattern. For example, as shown in FIG. 2, the two points 220, 221 may be required to be less than a threshold distance that is within the span of an index finger to a thumb as shown. This way, other types of touches could be rejected. In FIG. 2, the sensor array 210 is sized for a handheld device.

Figure 3:
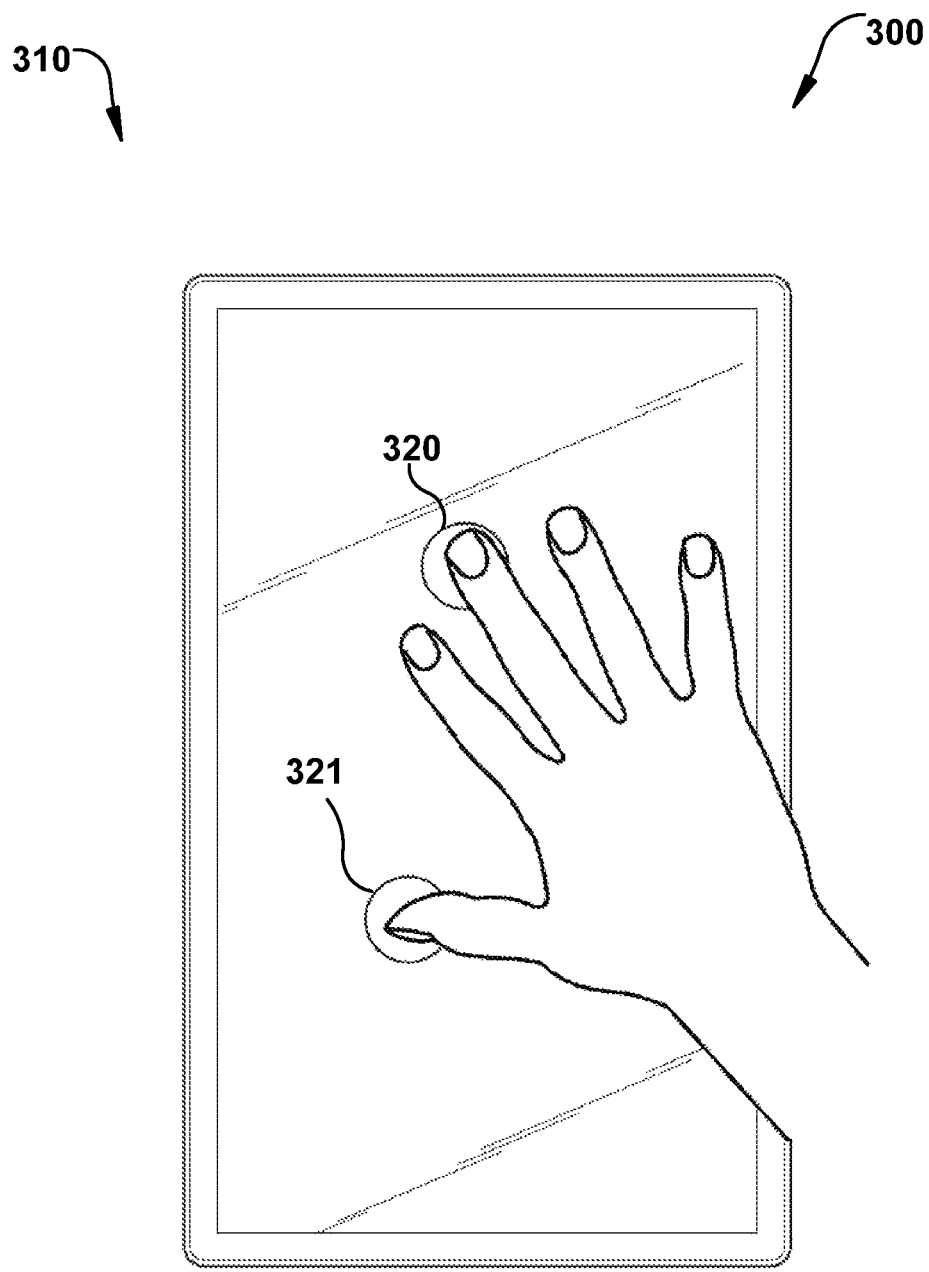
FIG. 3 illustrates a system using an exemplary interpolated variable impedance sensor array for gesture recognition.
Figure 4:
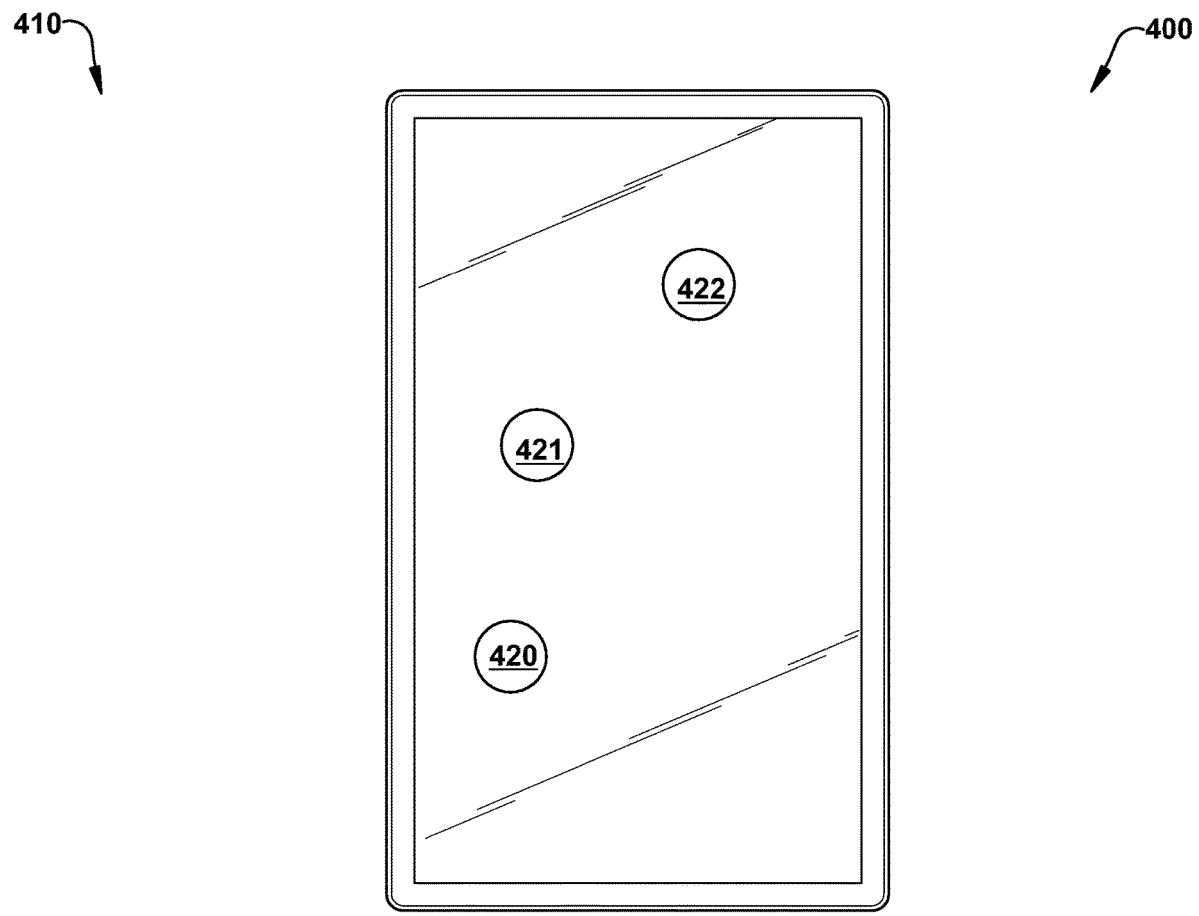
FIG. 4 illustrates a system using an exemplary interpolated variable impedance sensor array for gesture recognition.

Alternatively, as shown in FIG. 3, the two points 320, 321 may be required to be greater than a threshold distance that is greater than the span between fingers and/or the thumb of one hand. This way, types of touches from one hand could be rejected. Further, the processor may be programmed to look for specific combinations of touch points within certain distances of each other. For example, in FIG. 4, touches 420, 421, 422 correspond to a thumb, index finger, and middle finger respectively. The processor may be programmed to determine the relative distance between each of the touches 420, 421, 422 and determine if the distance meets one or more threshold criteria. This way, the processor may be programmed to recognize patterns created by various combinations of finger touches on the sensor array 410.

Figure 5:
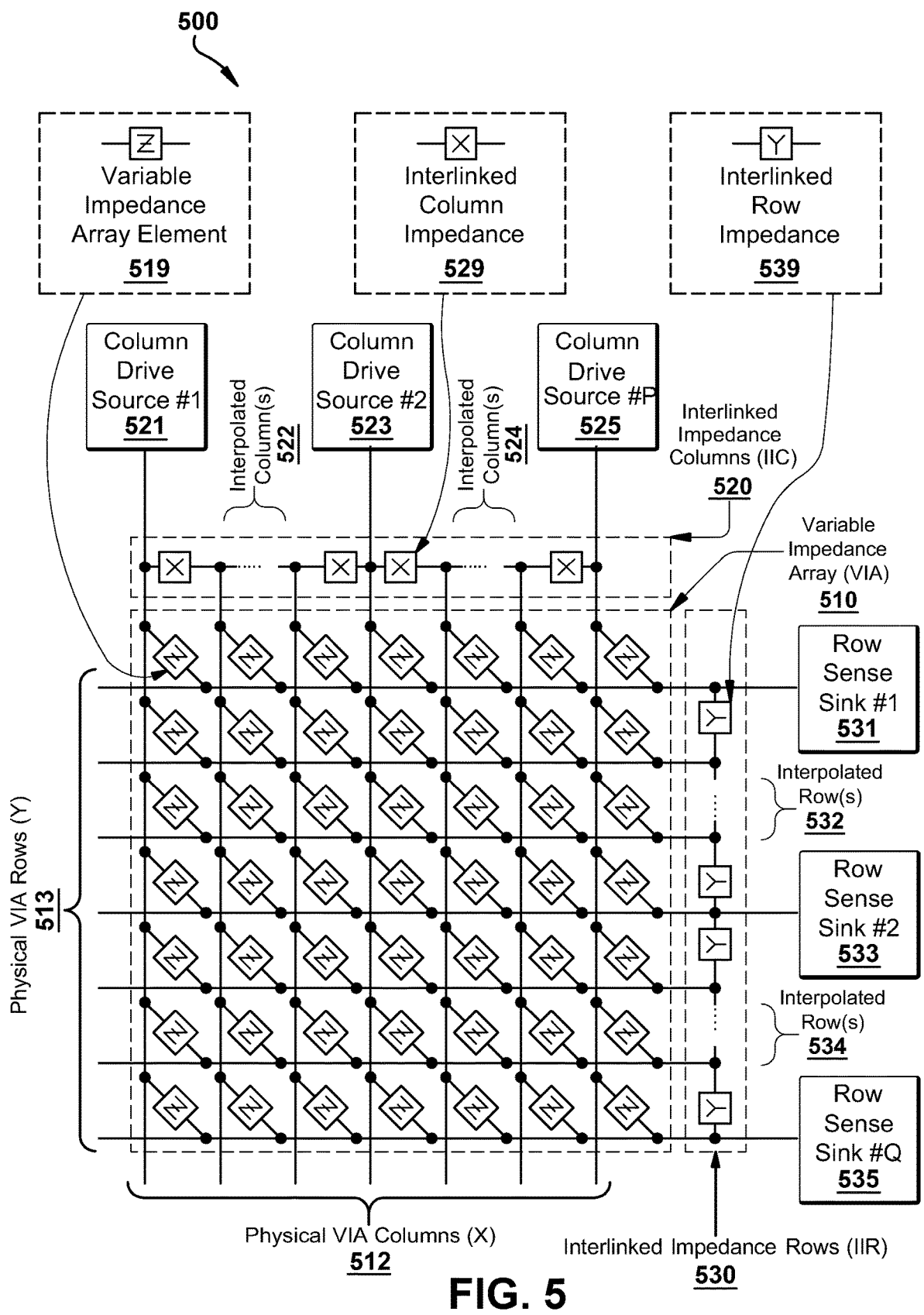
FIG. 5 illustrates an exemplary variable impedance touch sensor array with interlinked impedance columns and interlinked impedance rows.
Figure 6:
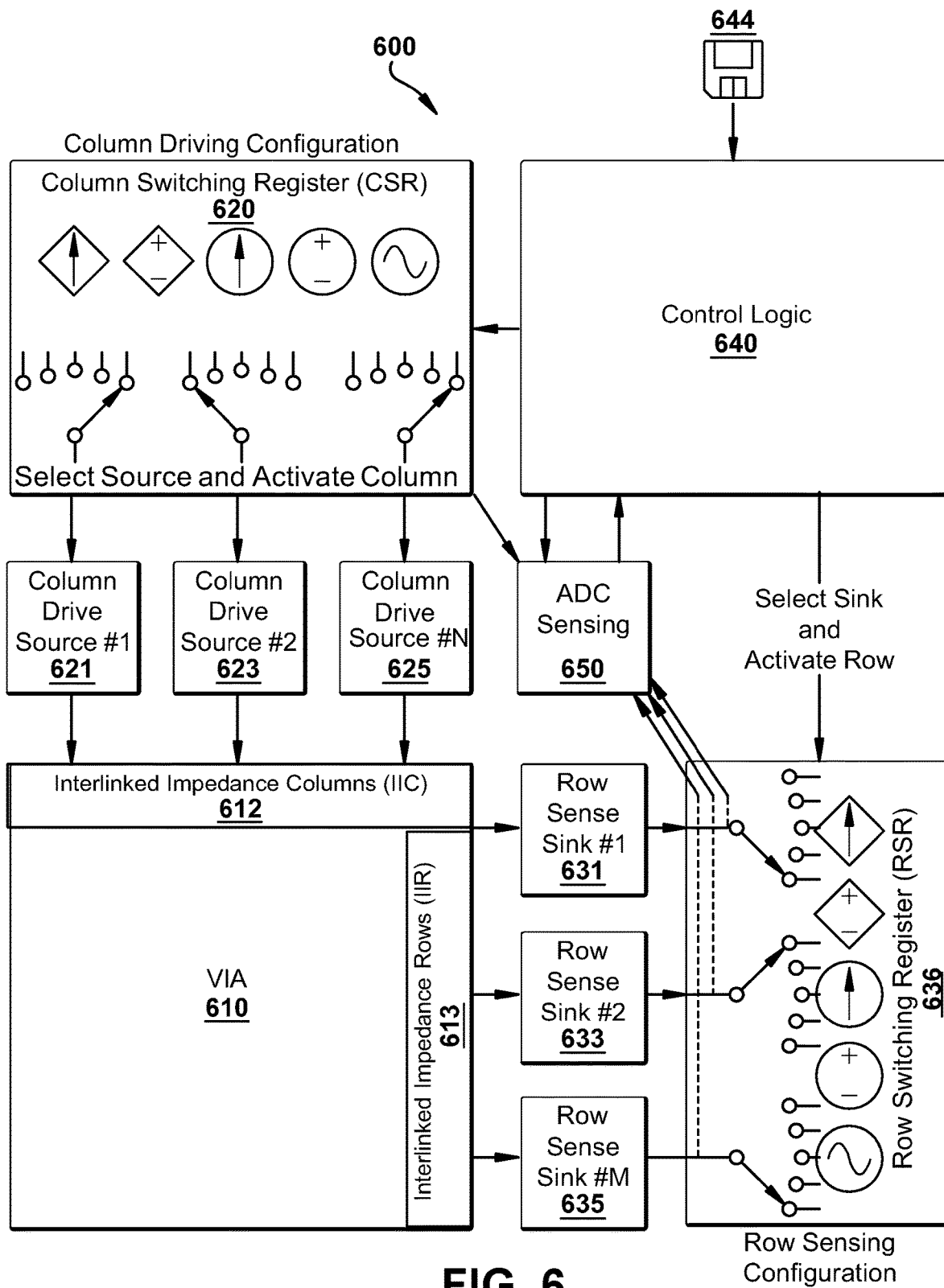
FIG. 6 illustrates an exemplary column switching register, row switching register, interlinked impedance column, and interlinked impedance row of an exemplary variable impedance touch sensor array.
Figure 7:
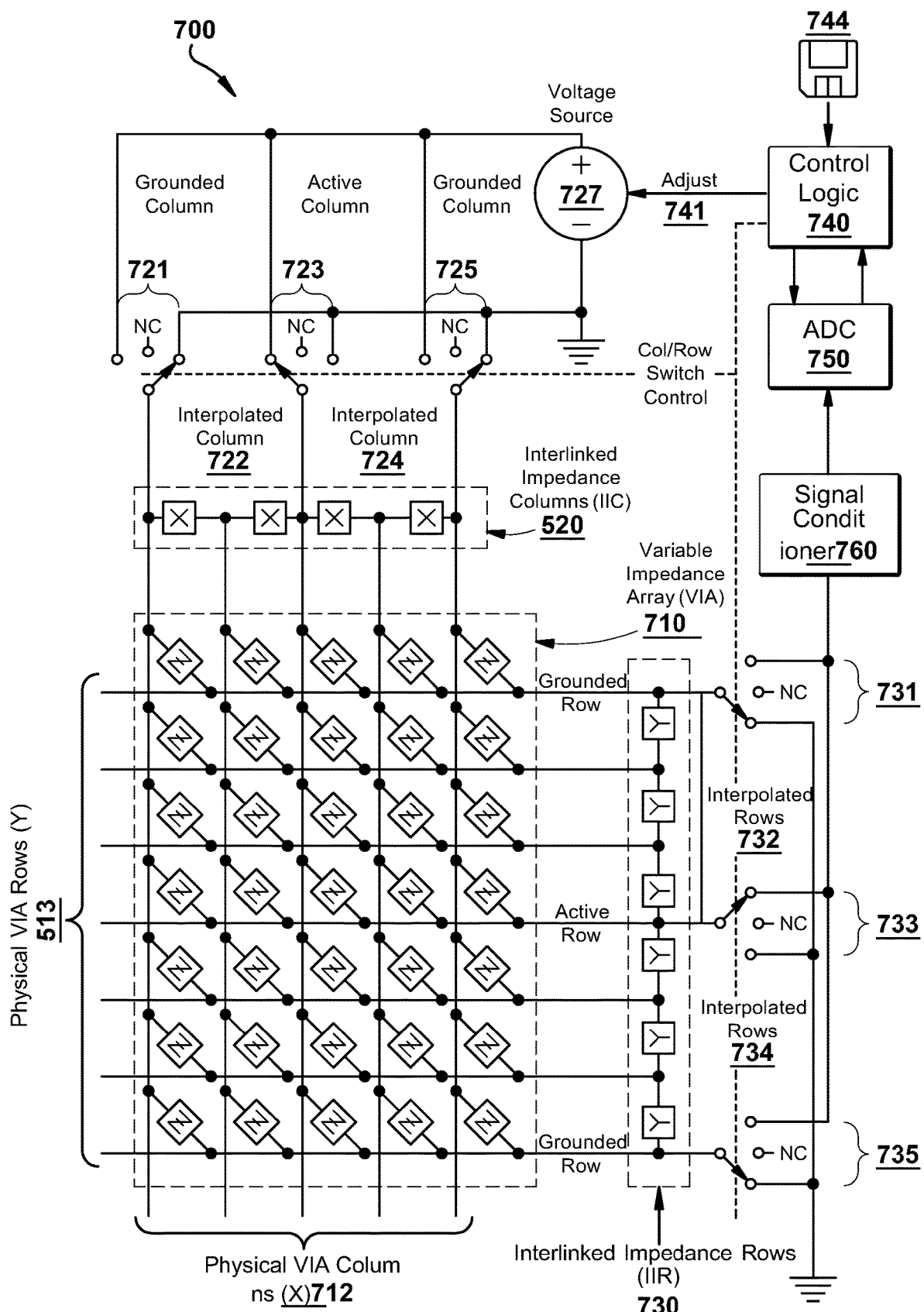
FIG. 7 illustrates an exemplary variable impedance touch sensor array.

FIGS. 5-7 illustrate an exemplary variable impedance touch sensor array 500, 600, 700 including interlinked impedance columns and interlinked impedance rows as well as an exemplary column switching register, row switching register, interlinked impedance column, and interlinked impedance row. FIG. 5 illustrates an exemplary variable impedance array 510, interlinked impedance columns 520, and interlinked impedance rows 530. Here the variable impedance array 510 includes columns 512 and rows 513 of an array in which individual variable impedance array elements 519 may interconnect within the row/column cross points of the array. These individual variable impedance array elements 519 may comprise active and/or passive components based on the application context, and include any combination of resistive, capacitive, and inductive components. Thus, the variable impedance array 510 array impedance elements are depicted generically in this diagram as generalized impedance values Z.

The physical variable impedance array columns 512 and variable impedance array rows 513 are connected via interlinked impedance columns 520 and interlinked impedance rows 530, respectively. The interlinked impedance columns 520 and interlinked impedance rows 530 are configured to reduce the number of columns and rows that are connected to the column drive sources 521, 523, 525 and the row sense sinks 531, 533, 535. As such, the combination of the interlinked impedance columns 520 and interlinked impedance rows 530 will reduce the external components necessary to interface to the variable impedance array columns 512 and variable impedance array rows 513. Within the context of the present invention, the number of interlinked impedance columns 520 interconnects will be configured to allow the reduction of the number of column drive sources 521, 523, 525 to less than the number of physical variable impedance array columns 512 (thus the number of external interlinked impedance columns is typically less than the number of internal interlinked impedance columns columns), and the interlinked impedance rows 530 interconnects will be configured to allow the reduction of the number of row sense sinks 531, 533, 535 to less than the number of physical variable impedance array rows 513 (thus the number of external interlinked impedance rows is typically less than the number of interlinked impedance rows rows). This reduction is achieved by having one or more interlinked impedance columns 520 elements 529 in series between each variable impedance array physical column 512 and one or more interlinked impedance rows 530 elements 539 between each variable impedance array physical row 513. Thus, the XXY variable impedance array sensor 510 is translated to an electrical interface only requiring P column drivers and Q row sensors. The present invention constrains $P \leq X$ and $Q \leq Y$ with many preferred embodiments satisfying the relations $X/P \geq 2$ or $Y/Q \geq 2$.

Note that within the context of these preferred embodiments, there may be circumstances where the interlinked impedance columns may incorporate a plurality of interlinked impedances with the interlinked impedance rows incorporating a singular interlinked impedance element, and circumstances where the interlinked impedance columns may incorporate a singular interlinked impedance element with the interlinked impedance rows incorporating a plurality of interlinked impedance elements.

The interlinked impedance columns 520 impedance elements 529 are configured to connect individual variable impedance array columns 512. These interlinked impedance columns 520 impedance elements 529 may comprise active and/or passive components based on the application context and include any combination of resistive, capacitive, and inductive components. Thus, the interlinked impedance columns 520 impedance elements 529 are depicted generically in this diagram as generalized impedance values X. As depicted in the diagram, the individual variable impedance array columns may either be directly driven using individual column drive sources 521, 523, 525 or interpolated 522, 524 between these directly driven columns.

The interlinked impedance rows 530 impedance elements 539 are configured to connect individual variable impedance array rows 513. These interlinked impedance rows 530 impedance elements 539 may comprise active and/or passive components based on the application context and include any combination of resistive, capacitive, and inductive components. Thus, the interlinked impedance rows 530 impedance elements 539 are depicted generically in this diagram as generalized impedance values Y. As depicted in the diagram, the individual variable impedance array rows may either be directly sensed using individual row sense sinks 531, 533, 535 or interpolated 532, 534 between these directly sensed rows.

The column drive sources 521, 523, 525 are generically illustrated as being independent in this diagram but may be combined in some configurations utilizing a series of switches controlled by a column switching register that defines the type of column drive source to be electrically coupled to each column that is externally accessible to the variable impedance array sensors 510. Variations of AC/DC excitation, voltage sources, open circuits, current sources, and other electrical source driver combinations may be utilized as switched configurations for the column drive sources 521, 523, 525. The column switching register may be configured to both select the type of electrical source to be applied to the variable impedance array sensors 510 but also its relative amplitude/magnitude.

The row sense sinks 531, 533, 535 are generically illustrated as being independent in this diagram but may be combined in some configurations utilizing a series of switches controlled by a row switching register that defines the type of row sense sinks to be electrically coupled to each row that is externally accessible to the variable impedance array sensors 510. Variations of AC/DC excitation, voltage sources, open circuits, current sources, and other electrical sense sink combinations may be utilized as switched configurations for the row sense sinks 531, 533, 535. The row switching register may be configured to both select the type of electrical sink to be applied to the variable impedance array sensors 510, but also its relative amplitude/magnitude.

Further detail of the column switching register and row switching register column/row source/sink operation is depicted in FIG. 6 (600) wherein the variable impedance array 610 is interfaced via the use of the interlinked impedance columns 612 and interlinked impedance rows 613 impedance networks to column drive sources 621, 623, 625 and row sense sinks 631, 633, 635, respectively. The column switching registers 620 may comprise a set of latches or other memory elements to configure switches controlling the type of source drive associated with each column drive source 621, 623, 625, the amplitude/magnitude of the drive source, and whether the drive source is activated. Similarly, the row switching registers 630 may comprise a set of latches or other memory elements to configure switches controlling the type of sense sink associated with each row sense sink 631, 633, 635, the amplitude/magnitude of the sink, and whether the sink is activated.

As mentioned previously, the interlinked impedance columns 612 and interlinked impedance rows 613 impedance networks may comprise a wide variety of impedances that may be static or actively engaged by the configuration of the column switching register 620 and row switching register 630, respectively. Thus, the column switching register 620 and row switching register 630 may be configured in some preferred embodiments to not only stimulate/sense the variable impedance array 610 behavior, but also internally configure the interlinked nature of the variable impedance array 610 by reconfiguring the internal column cross-links and the internal row cross-links. All this behavior can be determined dynamically by control logic 640 that may include a microcontroller or other computing device executing machine instructions read from a computer-readable medium 644. Within this context, the behavior of the analog-to-digital (ADC) converter 650 may be controlled in part by the configuration of the column switching register 620 and/or row switching register 630, as well as the control logic 640. For example, based on the configuration of the column switching register 620 and row switching register 630, the ADC 650 may be configured for specific modes of operation that are compatible with the type of sensing associated with the column switching register 620/row switching register 630 setup.

FIG. 7 illustrates 700 an exemplary variable impedance array sensor 710 in which the interlinked impedance columns 720 form a reduced electrical interface to the physical variable impedance array sensor columns 712 that comprise the variable impedance array sensor array 710. Similarly, the interlinked impedance rows 730 form a reduced electrical interface to the physical variable impedance array sensor rows 713 that comprise the variable impedance array sensor array 710. Note in this example that the number of physical variable impedance array columns 712 need not be the same as the number of physical variable impedance array rows 713. Furthermore, the number of column interpolation impedance components (X) serially connecting each column of the variable impedance array 710 need not be equal to the number of row interpolation impedance components (Y) serially connecting each row of the variable impedance array 710. In other words, the number of interpolated columns 722, 724 need not be equal to the number of interpolated rows 732, 734.

The control logic 740 provides information to control the state of the column switches 721, 723, 725 and row switches 731, 733, 735. The column switches 721, 723, 725 define whether the individual variable impedance array columns are grounded or driven to a voltage potential from a voltage source 727 that may in some embodiments be adjustable by the control logic 740 to allow on-the-fly adjustment 741 which can be used to compensate for potential non-linearities in the driving electronics. Similarly, the row switches 731, 733, 735 define whether an individual variable impedance array row is grounded or electrically coupled to the signal conditioner 760 and associated ADC 750.

In the configuration depicted in FIG. 7, the variable impedance array sensors 710 comprise uniformly two interpolating impedances between each column (X) and three interpolating impedances between each row (Y). This illustrates the fact that the number of interpolating columns need not equal the number of interpolating rows in a given variable impedance array. Furthermore, it should be noted that the number of interpolating columns need not be uniform across the variable impedance array, nor does the number of interpolating rows need be uniform across the variable impedance array. Each of these parameters may vary in number across the variable impedance array.

Note also that the variable impedance array sensors 710 need not have uniformity within the row or column interpolating impedances and that these impedances in some circumstances may be defined dynamically in number and/or value using MOSFETs or other transconductors. In this exemplary variable impedance array sensor segment, it can be seen that one column 723 of the array is actively driven while the remaining two columns 721, 725 are held at ground potential. The rows are configured such that one row 733 is being sensed by the signal conditioner 760/ADC combination 750 while the remaining rows 731, 735 are held at ground potential.

The processor is communicatively coupled to the sensor array shown in the Figures and is programmed to receive pressure information from the sensor array. As described above and in the incorporated references, the sensor array is designed to provide a continuous pressure gradient with a high-density array. In the interpolated variable impedance sensor array, interpolation blocks (interlinked impedance columns and interlinked impedance rows) allow the variable impedance array sensors to be scanned at a lower resolution. Because of the configuration of the interlinked impedance columns and interlinked impedance rows, the sensor hardware can properly downsample the signal in the variable impedance array (in a linear fashion). As a result, the scanned values in the lower-resolution array (touch sensor matrix) data structure) extracted from this variable impedance array sensor data resemble that of a linearly downsampled sensor response. This downsampling allows reconstruction of the positions, force, shape, and other characteristics of touches at the resolution of the variable impedance array (and even possibly at a higher resolution than the variable impedance array) in software.

As an example, on a variable impedance array sensor array constructed with 177 column electrodes and 97 row electrodes having a 1.25 mm pitch, it could be possible in theory to build electronics with 177 column drive lines and 97 row sense lines to support sensing of this entire variable impedance array. However, this would be prohibitive in terms of cost and it would be very difficult to route that many row and sense lines on a conventional printed circuit board in a space efficient manner. Additionally, this 177×97 variable impedance array sensor configuration would require scanning 177×97=17169 intersections, which with a low power microcontroller (such as an ARM M3) would result in a maximum scan rate of approximately 10 Hz (which is unacceptably slow for typical user interaction with a touch screen). Finally, assuming 16-bit ADC values, storage for these touch screen values would require 17169×2=34 KB of memory for a single frame, an excessive memory requirement for small microcontrollers that may only be configured with 32 KB of RAM. Thus, the use of conventional row/column touch sensor technology in this context requires a much more powerful processor and much more RAM, which would make this solution too expensive and complex to be practical for a consumer electronics application.

Rather than scanning the exemplary sensor array described above at the full 177×97 resolution, the system is configured to scan at a lower resolution but retain the accuracy and quality of the signal as if it had been scanned at 177×97. The drive electronics on a typical present invention embodiment for this sensor array would require only 45 column drivers and 25 row drivers. The interpolation circuit allows the system to scan the 177×97 array using only a complement of 45×25 electronics. This cuts the number of intersections that must be scanned down by a factor of 16 to 45×25=1125. This configuration allows scanning the sensor at 150 Hz and reduces memory consumption in a RAM-constrained microcontroller application context. Although the ability to resolve two touches that are 1.25 mm together (or to see exactly what is happening at each individual sensor element) is lost, it is still possible to track a touch at the full resolution of the variable impedance array sensors because of the linearity of the row/column interpolation performed by using the (interlinked impedance columns and interlinked impedance rows. In some embodiments the grid spacing is less than or equal to 5 mm.

As discussed above in reference to FIGS. 1-3, the processor may be programmed to look for specific combinations of touch points within certain distances of each other. The processor may be programmed to determine the relative distance between each of the touches and determine if the distance meets one or more threshold criteria. This way, the processor may be programmed to recognize patterns created by various combinations of finger touches on the sensor array. The processor may also be programed to determine the relative pressure between the two more touches on the sensor array and to associate the pattern and pressure response with a gesture. The processor may provide input to a UI of an associated device based on the gesture, pattern, and/or pressure response.

Figure 8:
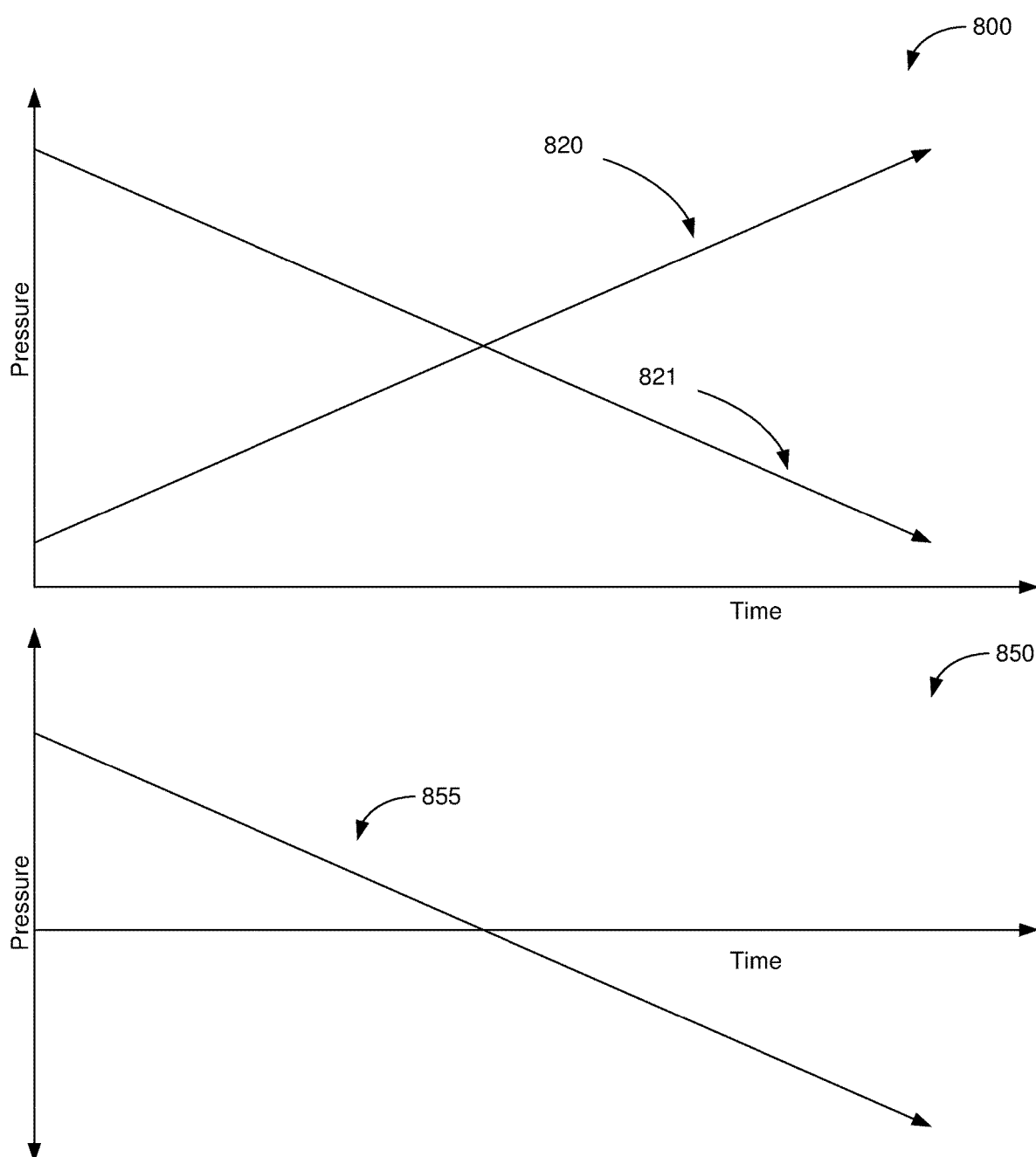
FIG. 8 shows exemplary pressure response curves for point sets in systems using exemplary interpolated variable impedance sensor arrays for gesture recognition.
Figure 9:
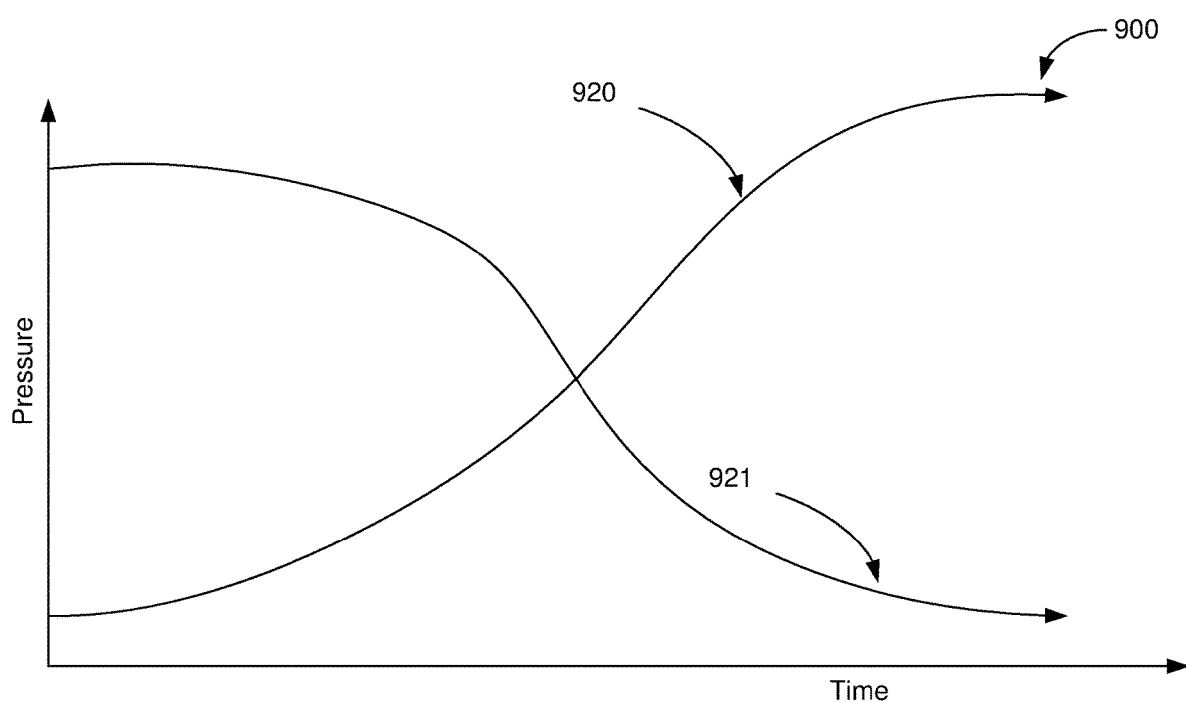
FIG. 9 shows exemplary pressure response curves for point sets in systems using exemplary interpolated variable impedance sensor arrays for gesture recognition.

In one embodiment, the processor is programmed to determine if a user is performing a see-saw pattern on the sensor array by touching the array at two or more points and varying the pressure at the two or more points in a rocking manner, that is increasing the pressure at one point while simultaneously decreasing the pressure at another point. For example, FIG. 8 shows exemplary pressure response curves 800 for the point sets 420/421, 520/521, 620/621 in FIGS. 4 through 6 respectively. The curve 820 corresponds to the pressure at touch 420, 520, 620 in FIGS. 4 through 6 respectively and the curve 821 corresponds to the pressure at touch 421, 521, 621 in FIGS. 4 through 6 respectively. The curves 820, 821 illustrate an exemplary pattern in which the pressure at one touch increases as the other decreases. The second graph 850 in FIG. 8 shows the curve 855 of the difference between the pressure of each touch in the touch point sets 420/421, 520/521, 620/621 in FIGS. 4 through 6 respectively. In this example, the difference between the two is uses. But the processor may use other mathematical combinations of the pressure data from the two or more points including ratios and multiples. The pressure response curves 820, 821 illustrated in FIG. 8 are only exemplary, and the disclosed systems may accommodate other pressure response curves such as those 920, 921 shown in FIG. 9.

Figure 10:
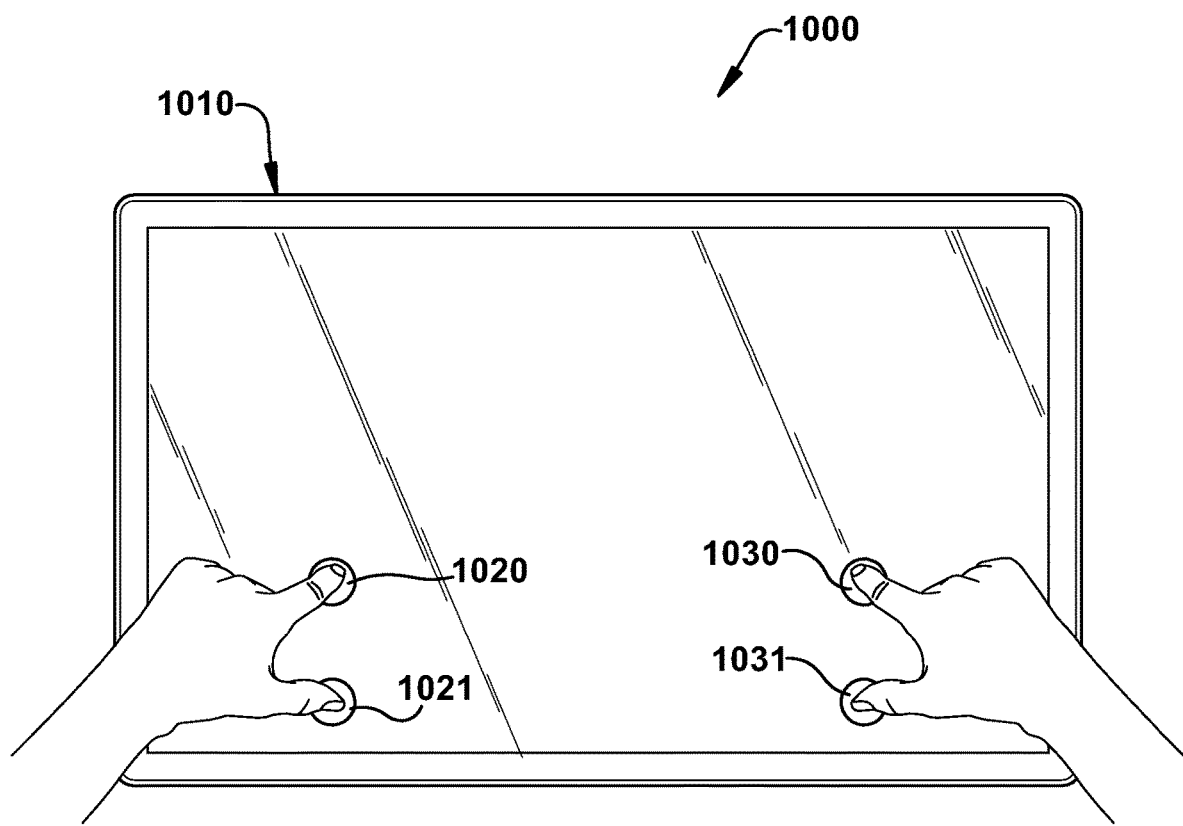
FIG. 10 illustrates a system using an exemplary interpolated variable impedance sensor array for gesture recognition.

The process may further be programmed to provide adjustment information to a coupled device based on the gesture, pattern, and/or pressure response. For example, as the user varies the pressure at two or more touch points in a see-saw gesture, the processor may adjust UI elements (such as brightness, magnification) accordingly. Additionally, the processor may cause the UI to scroll, fast forward, or reverse based on the based on the gesture, pattern, and/or pressure response. Additionally, using multiple touch points, the sensor array and processor may be configured to determine the relative orientation of fingers as well as the relative pressure allowing multi-dimensional input (e.g., scrolling in two dimensions). FIG. 10 illustrates an example 1000 in which a sensor array 1010 provides multi-dimensional input based on the relative location of touches and relative pressure of the touches. For example, the processor could be programmed to control horizontal scrolling based on the difference in pressure between points 1020 and 1030 or between points 1021 and 1031. Alternatively, the processor could be programmed to control horizontal scrolling based on some combination of the difference in pressure between points 1020 and 1030 and between points 1021 and 1031. Similarly, the processor could be programmed to control vertical scrolling based on the difference in pressure between points 1020 and 1021 or between points 1030 and 1031. Alternatively, the processor could be programmed to control vertical scrolling based on some combination of the difference in pressure between points 1020 and 1021 and between points 1030 and 1031.

In another embodiment, the processor is programmed to determine the continuous pressure change at one or more point on the sensor array and to cause the UI to provide visual feedback based on the continuous pressure at the one or more point. For example, a button on a touch screen may shrink or grow in proportion to the force applied. Alternatively, the process may be programmed to cause the UI to provide audible and/or haptic feedback in proportion to the force applied.

In another embodiment, the processor is programmed to determine if the pressure applied at one or more points exceeds a threshold and then determine if the pressure at the one or more points falls below a second threshold and to cause the UI to provide feedback (e.g., visual, audio, and/or haptic) after the pressure at the one or more points falls below the second threshold. The magnitude (e.g., brightness, duration, size, amplitude) of the feedback may be based on the magnitude of the pressure (e.g., the amount the pressure exceeded the threshold, how quickly the pressure exceeded the threshold, and/or how quickly the pressure fell below the second threshold). In one example, the UI may provide a "springy" response that resembles a bounce back after the pressure at touch is released. In another example, the UI may open an item if the pressure on an icon corresponding to the item exceeds a threshold and may "de-commit" or stop opening the item if the pressure is released within or exceed a specified time or release rate. In one example, a hard push and release quickly may open the item, but a slow release would cause the item to slide back into closed state. In another embodiment, the feedback is a graphic effect where the image on the screen gets distorted when the user touches it (e.g., elastic-like deformation). Additionally, a touch may cast a virtual shadow in the UI.

With the continuous pressure sensing systems and methods disclosed herein, feedback may be provided proportionally to the amount of force applied to the sensor array. Accordingly, in one embodiment, the processor is programmed to cause the UI to provide feedback proportional to the pressure at the one or more touch points. For example, the UI may cause objects to start opening and continue opening with more pressure thereby providing visual feedback. And the UI could provide feedback (e.g., visual, audio, haptic) once the object is open.

Figure 11:
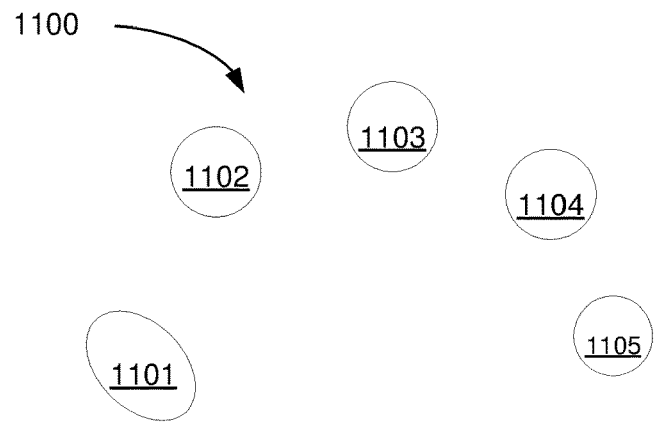
FIG. 11 illustrates examples of touch patterns for systems using exemplary interpolated variable impedance sensor arrays for gesture recognition.
Figure 11:
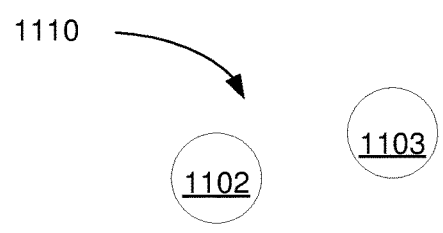
Figure 11:
Figure 11:
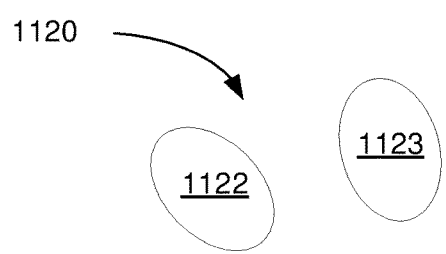
Figure 11:
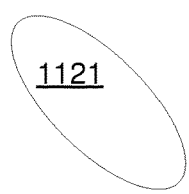

In another embodiment, the system uses a combination of (1) the touch pattern (the size, shape, and number) of the one or more points in contact with the sensor array instantaneously and/or over time together with (2) the pressure at the one or more touch points instantaneously and/or over time. The combination of these inputs is used to provide input to the processor and UI of a coupled device. FIG. 11 illustrates examples of how the touch pattern may change over time. At one instant, the touch pattern 1100 on a sensor array of a thumb 1101, index finger 1102, middle finger 1103, ring finger 1104, and pinky finger 1105 is shown. At another instant in time, the user may pick up the pinky finger 1105 and ring finger 1104 leaving a touch pattern 1110 distinct from the first. Similarly, the user may roll his or her fingers causing more surface of the fingers to be in contact with the sensor array creating a touch pattern 1120 with more elongated contact surfaces 1121, 1122, 1123.

For example, one finger may apply a heavier force and another finger has a lighter force. The finger with the heavier force may be assigned to an action to hold an object and the finger with the lighter force may be assigned to move the background around the held object. In one application for instance, a user may press hard on a photo to select it and then use a light touch with another finger to move it around a map or gallery.

Figure 12:
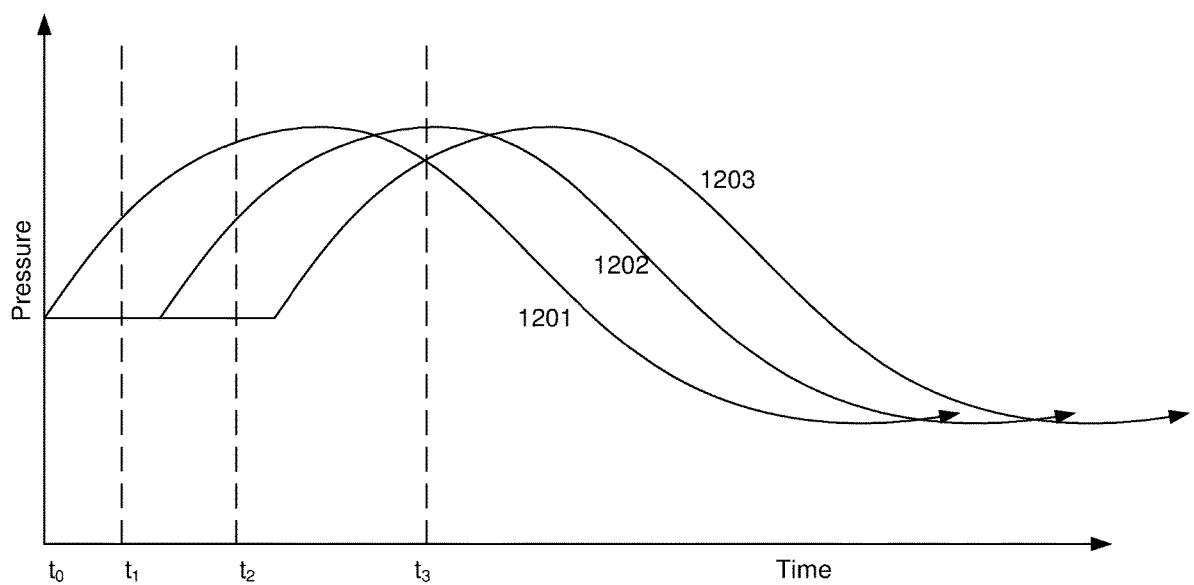
FIG. 12 shows exemplary pressure response curves for point sets in systems using exemplary interpolated variable impedance sensor arrays for gesture recognition.

FIG. 12 illustrates the pressure at the one or more touch points instantaneously and over time. In the example shown in FIG. 12, the three curves 1201, 1202, 1203 correspond to the thumb 1101, index finger 1102, and middle finger 1103 touch points in FIG. 11. In FIG. 12, the pressure at time $t_0$ on each of the thumb 1101, index finger 1102, and middle finger 1103 touch points is approximately equal. Thereafter, the pressure on the thumb 1101 increases (as shown in curve 1201) while the pressure on the other two finger remains fairly constant. Accordingly, at time $t_1$, the pressure on the thumb has increased but the pressure on the other two fingers is about the same as at $t_0$. Thereafter, the pressure on the index finger 1102 increases and at time $t_2$, the pressure on the thumb 1101 and index finger 1102 is increased but the pressure on the middle finger is approximately the same as at $t_0$. Thereafter, the pressure on the thumb 1101 decreases and the pressure on the index finger 1102 and middle finger 1103 increase. At time $t_3$, the pressure at all three points is elevated over time $t_0$, but the pressure on the thumb 1101 is decreasing. As shown, the pressures on the three fingers rise and fall in sequence corresponding to a rolling or wave patter from the thumb 1101 to the index finger 1102 to the middle finger 1102. The systems disclosed herein may use a pressure patter such as that illustrated in FIG. 12 to provide input to the processor and UI of a coupled device. And the systems disclosed herein may use the combination of (1) the touch pattern (the size, shape, and number) of the one or more points in contact with the sensor array instantaneously and/or over time together with (2) the pressure at the one or more touch points instantaneously and/or over time to provide input to the processor and UI of a coupled device. And the systems disclosed herein may be configured to provide feedback (e.g., visual, audio, haptic) based on the combination of (1) the touch pattern (the size, shape, and number) of the one or more points in contact with the sensor array instantaneously and/or over time together with (2) the pressure at the one or more touch points instantaneously.

For example, the processor and UI may be configured to show a number of windows based on the pressure, number, and/or pattern of touches. And different fingers or body parts with varying levels of force can be used to create different actions in the UI. Various different input touches may include: knocking on a surface like a door, licking it, elbowing it, breathing on it, rolling a hand across it, laying a hand on it, sculpting it like clay, spiraling with progressive force, rubbing it by setting fingertips then moving arm, finger tapping from pinky to pointer, touching with knuckle(s), touching with elbow(s), touching with a phalanx (or phalanges), scratching (small area with high force).

In one example, a device includes variable impedance touch sensor arrays that comprise swipeable and/or pressable controls on the front and/or back surface. Such controls enable the user to control device functions. Additionally, using the continuous pressure response of the variable impedance touch sensor arrays, the controls can control the magnitude of the response relative to the amount of pressure applied to the variable impedance touch sensor arrays. For example, the sensors could control the volume and/or brightness relative to the amount of pressure applied to the array or section of an array assigned to controlling the respective function. The force controls using variable impedance touch sensor arrays can be used for other audio controls including selecting an audio source, changing channels, or advancing or sending a reverse or rewind command based on the location of the touch on the device. And the volume can be controlled relative to the amount of pressure of the touch on the variable impedance touch sensor arrays.

Figure 13:
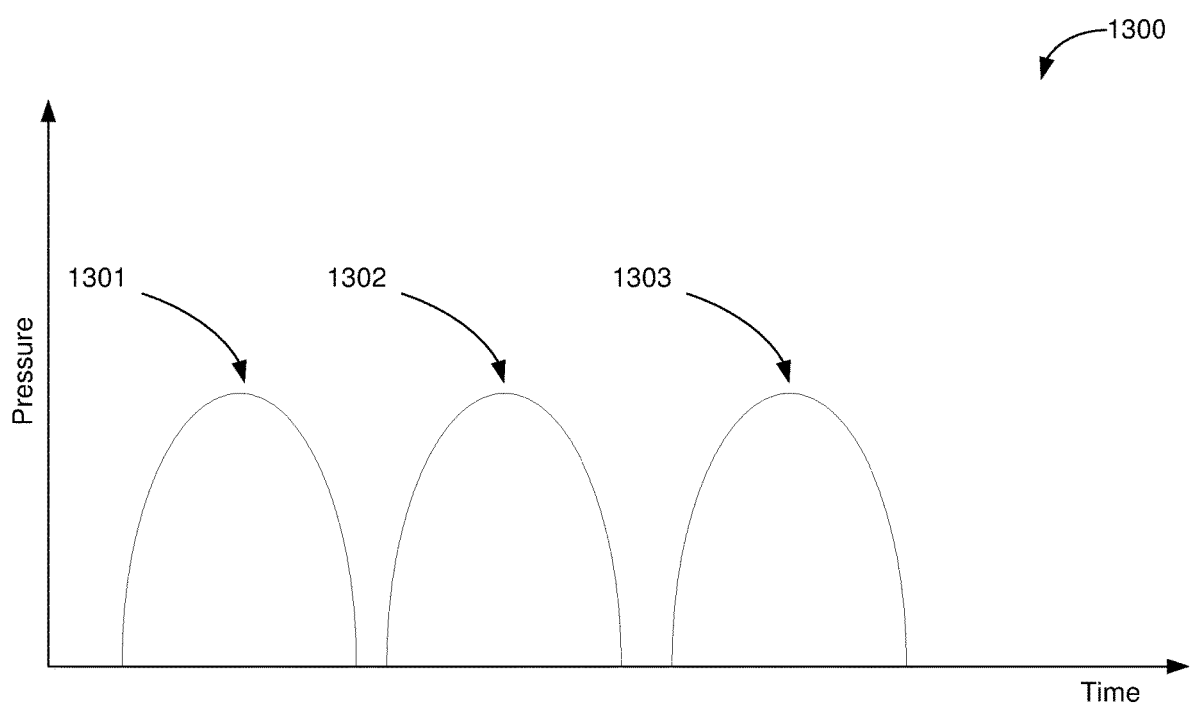
FIG. 13 illustrates a system using an exemplary interpolated variable impedance sensor array for gesture recognition.

In another embodiment, variable impedance touch sensor arrays are embedded in the steering device such that the variable impedance touch sensor arrays can detect a user's grip or squeeze of part of the device. The coupled processor may be programmed to apply a control signal to the device or a communicatively coupled device based on the grip or squeeze, sequence of grips or squeezes, and/or pattern of grips and or squeezes. For example, a double squeeze (or similar or more complex pattern) could be used to power on a device or send a control signal to other systems (e.g., audio systems, lighting, etc.). One advantage of requiring patterns or sequences of grips or squeezes is to differentiate between spurious pressure and desired actions and thereby reject spurious inputs. FIG. 13 illustrates an exemplary embodiment of such a system that uses a grip or squeeze pattern to reject spurious inputs. As shown in the graph 1300 of FIG. 13, three sequential grips 1301, 1302, 1303 are received at the steering wheel. This specific pattern (within a given threshold) can be recognized and used to send control signals to automotive systems.

In one example, a squeeze or grip is used to select an item in one of the systems (e.g., audio, lighting, navigation, etc.). In one example, the squeeze or grip may be used for navigation, so the user does not have to interact with a navigation screen. Alternatively, such systems may be used to transfer control of a device to a user. For example, a tool with a continuous engagement feature disengage the continuous engagement feature when the user squeezes or grips the tool with a threshold force and/or pattern. Similarly, the grip or squeeze strength and/or pattern could be used to control the speed and/or function of a tool.

In additional embodiments, the variable impedance touch sensor arrays incorporated in a device may be used to detect when the user is not adequately gripping the tool. For example, if the driver becomes drowsy or is distracted, the system may use the continuous pressure information from the variable impedance touch sensor arrays to determine that the user needs an alert that other safety measures need to be implemented (e.g., stopping the tool, slowing the tool speed or initiating an alarm). Additionally, because the variable impedance touch sensor arrays can be used to determine continuous pressure patterns, the system uses included variable impedance touch sensor array data to generate a force profile that can be used to determine if the user is operating the tool with limited or impaired control.

The variable impedance touch sensor arrays of the present invention may be incorporated in various surfaces in a device or tool to create control surfaces. The variable impedance touch sensor arrays may be incorporated under the surface covering (e.g., leather, vinyl, plastic, fabric) of the surface. The arrays may have outlines stitched into the covering material or printed indicators or LED to make area glow to indicate the touch sensitive areas to the user.

With the variable impedance touch sensor arrays disclosed herein, essential or common controls can be moved into the steering wheel (or other surfaces as described above) itself. The disclosed sensors allow incorporation of touch arrays on the outside of the surfaces even when covered with leather, vinyl, or other textured material (e.g., to ensure that the user can have a good grip on the wheel). With the disclosed variable impedance touch sensor array technology, the sensors may be incorporated into the outer area of the surface itself. This way the user does not need his or her hands away from the safe positions on the device to make commands.

In some embodiments, the control surfaces also include haptic feedback devices for providing feedback to the driver based on the user's touch input. In some embodiments, the sensor arrays are used to determine patterns or gestures on the control surfaces that are used to control systems.

In other embodiments, the variable impedance touch sensor arrays of the present invention may be incorporated into clothing or wearable devices. With the disclosed variable impedance touch sensor array technology, the sensors may be incorporated into material of the wearable. Clothing and other wearable include sensors that check for proper fit. The variable impedance touch sensor arrays incorporated in the wearables can be used to determine instantaneous force signatures and patterns over time to determine that the fit of the wearable is proper. Additionally, the variable impedance touch sensor arrays could be used to redistribute and/or realign adjustments to accommodate users based on their instantaneous force signatures and patterns over time. In other embodiments, the variable impedance touch sensor arrays can be used to provide input to coupled systems.

In one example, the arrays are incorporated into wearable to provide of biomechanical information. For example, a bodysuit (or other wearable) incorporating the arrays can use pressure patterns across the suit to recognize load distribution and provide feedback to the user. For instance, the system may determine that a user lifting weights has an improper load distribution and instructs the user to redistribute the weight and/or activate different muscle groups to correct the impropriety. Additionally, the bodysuit may use the pressure data to monitor health and conditions of the user. The arrays may be incorporated into apparel for a user's hand(s) like gloves. This way, the arrays can determine force patterns for the user's hand(s) and use that for control data.

In one embodiment, the arrays are incorporated into the surface of watch (the wristband and/or watch face). The system uses the force pattern (including differential force) to control functions of the watch and/or a connected device (e.g., mobile device). Force interaction with the watch improves the efficiency of the interface for example through enabling/disabling a touch interface (e.g., touchscreen) of the watch through a touch pattern (e.g., a hard press). Additionally, the system may use a force pattern to determine the posture of the wrist and use that as a control signal. In one example, the user flexing his or her wrist creates tension in the wristband that can be used as a control signal. A user swinging an arm considerably also produces a force pattern that can be used as a control signal. Other actions such as placing a user's watched wrist on the table, grabbing the wrist band tightly with the other hand, and touching someone with the watch also produce force patterns that can be used as a control signal.

Figure 14:
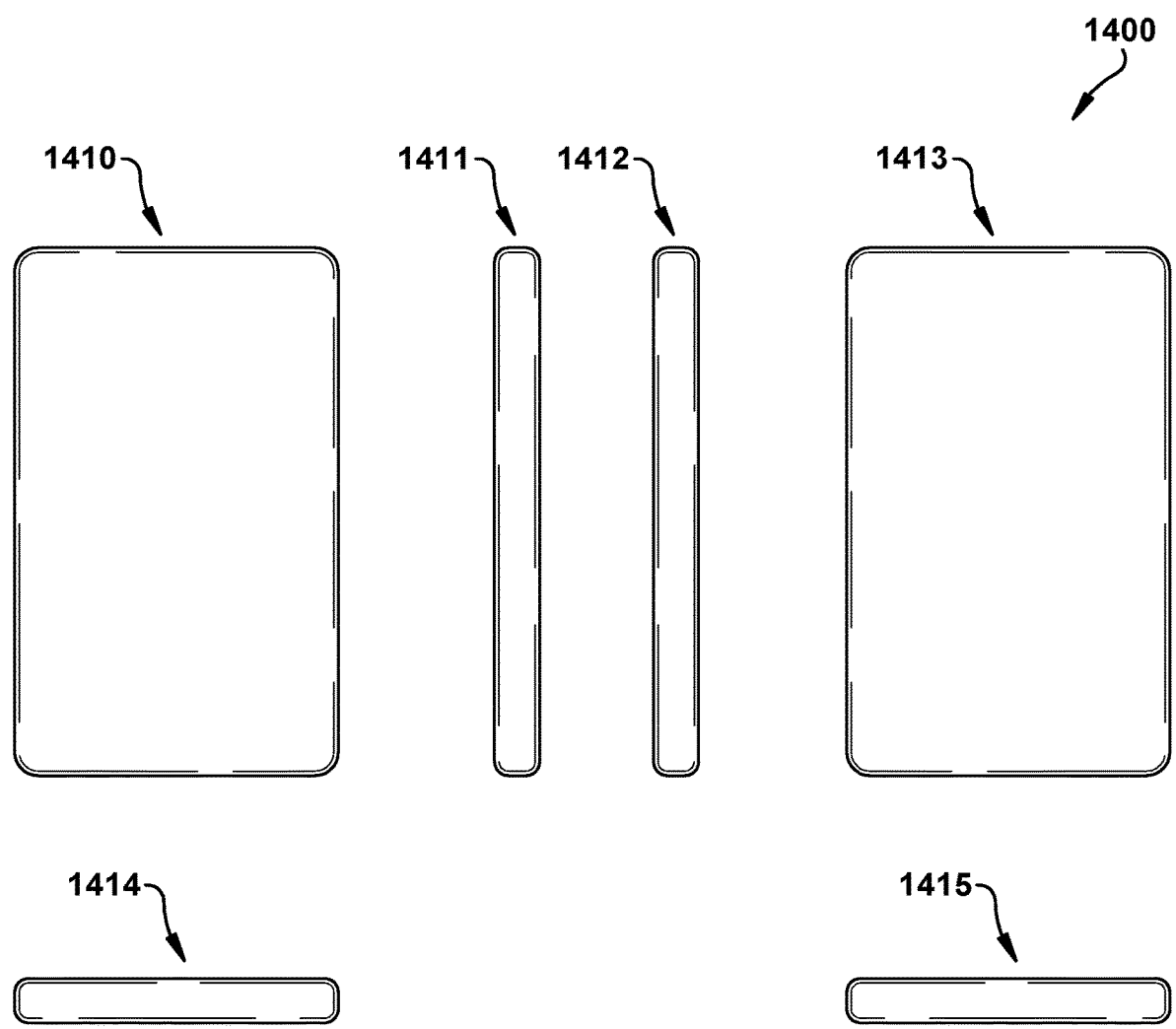
FIG. 14 illustrates a system using an exemplary interpolated variable impedance sensor array for gesture recognition.

FIG. 14 shows six views of a handheld device 1400: a front view 1410, a first side view 1411, a second side view 1412, a back view 1413, a top view 1415, and a bottom view 1415. In an exemplary system, the interpolated variable impedance touch sensor arrays disclosed herein are incorporated in a portion of one or more of the surfaces 1410-1415 of a handheld device shown in FIG. 14. In this embodiment, the system uses the combination of (1) the touch pattern (the size, shape, and number) of one or more points in contact with the sensor array on one or more faces of the device instantaneously and/or over time together with (2) the pressure at the one or more touch points on one or more faces of the device instantaneously may be used to activate different layers used in programs or visual layers in the UI.

In one example, with one or more interpolated variable impedance touch sensor arrays in the back 1413 of the device, the system may use the relative pressure between the front 1410 and back 1413 sensor as a gesture. For example, a press on the front 1410 may correlate to a zoom in to a map, and press on the back 1413 may correlate to a zoom out.

Figure 15:
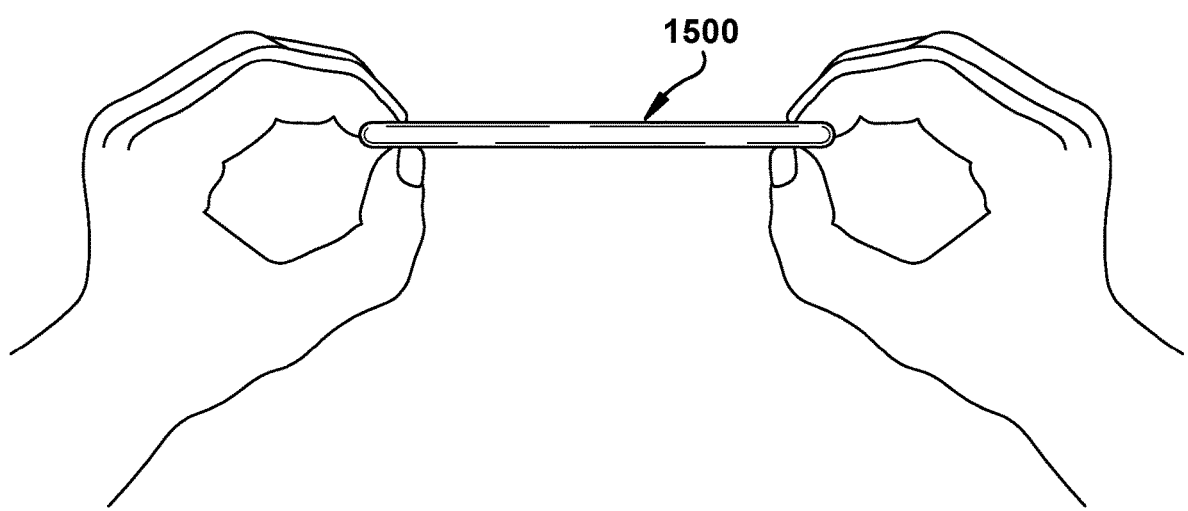
FIG. 15 illustrates a system using an exemplary interpolated variable impedance sensor array for gesture recognition.

Additionally, the differential pressure between one or more points on the faces 1410-1415 of the device can be sued as gesture inputs. For example, as shown in FIG. 15, flexing the device 1500 into a convex shape or a concave manner or twisting the device will be detected as a pressure pattern on the affected faces and/or as a pressure differential between the faces. For example, bending one way may increase the volume or zoom in, bending the other way could decrease the volume or zoom out. A bend may also be used for other command such as Use to turning a page or switching apps. And as described above for an array on the front of a device, differential force gestures on the back and/or sides of the device may be used. For example, a user may place two fingers (e.g., one lower and one higher) on the back of the phone and the system uses the difference in pressure for a control signal like scrolling up and down.

Also, a pinch with an index finger on back of phone and thumb on front display surface can be used as a gesture input with corresponding commands such as calling up different menus. As described above, the system may use the pattern (including the location) of the touch on each side of the device to determine the appropriate gesture and reject spurious touch inputs.

Moreover, the interpolated variable impedance touch sensor arrays may be used to detect pressure patterns on one or more faces of the device that may damage the device. Using this input, the system may alarm if a user tries to sit with the device in a pocket in a way that would damage the device. And the system may detect when the device is bent and/or under strain.

Figure 16:
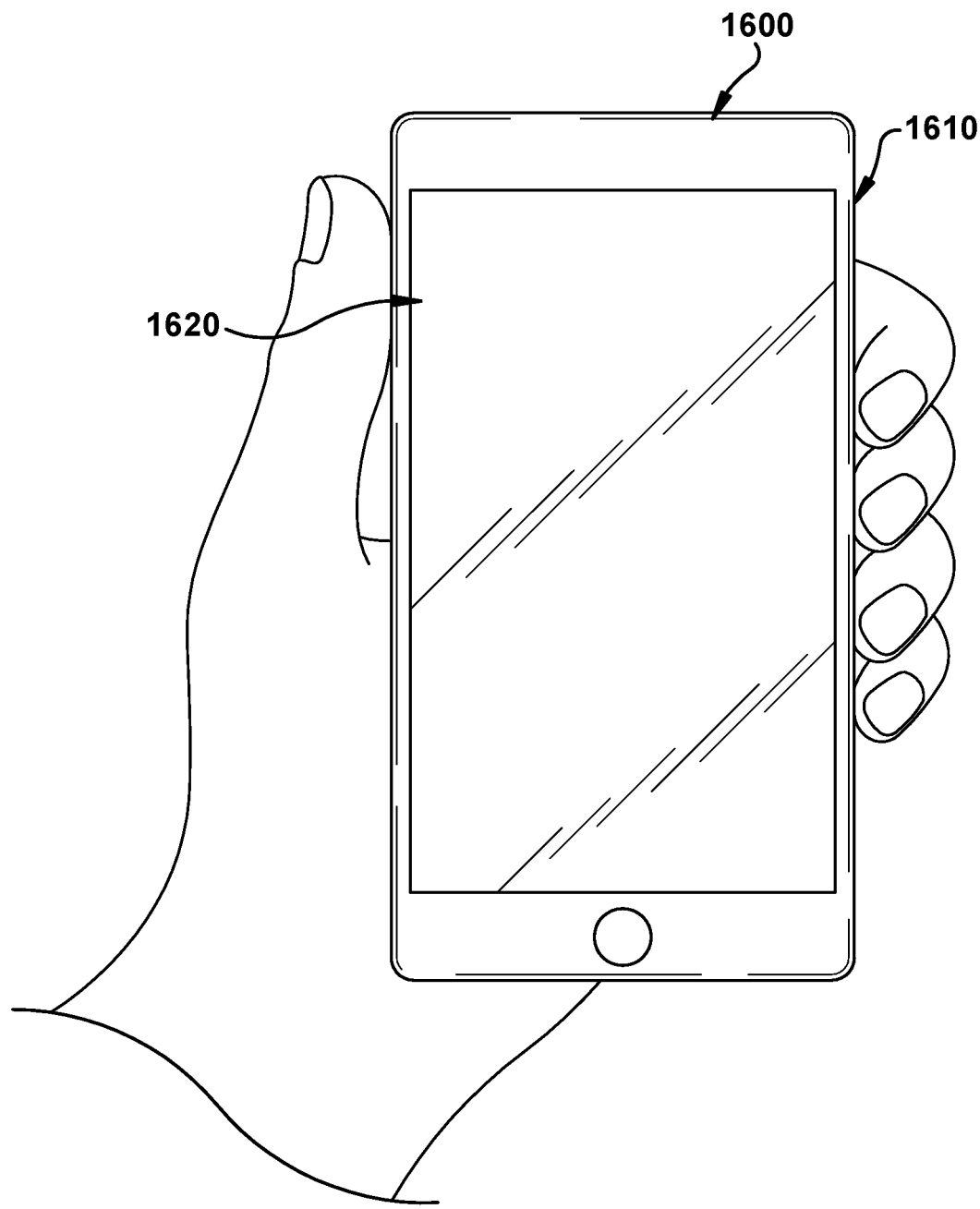
FIG. 16 illustrates a system using an exemplary interpolated variable impedance sensor array for gesture recognition.

What is more, as shown in FIG. 16, pressure applied on the lateral sides 1610, 1620 of the device 1600 may be used as a gesture input. For example, a light press on the left side 1620 slowly pushes the current app to the right revealing the app below. When the user presses hard enough, a haptic feedback may be caused and the new app snaps into place. If the user presses even harder, the systems starts scrolling through apps, with a haptic click for each new app. And applying more pressure scrolls faster. The same may apply for pushing on the right side of the screen 1610, except the user goes to the next app instead of going to the previous. The same gesture could also be used for going to the next and previous page within a book, magazine or web page. Further, pushing on the upper corners versus the lower corners could have a different effect to distinguish going between apps and going between pages within the same app.

Similarly, a combination of pressure between the sides 1610, 1620 use as a squeeze gesture on both sides could be used as a gesture input to cause a control signal to, for example, enable application switching (where scrolling would be engaged to select the desired app).

Moreover, having a force-aware mobile device with interpolated variable impedance touch sensor arrays on multiple sides enables detection of the device's environment, even when not in use: in a pocket, purse, underwater, being sat on, left on a table etc.

In other examples, a push hard on side of the device (or screen) brings up a full representation of the book the user is reading. Thereafter, a tap anywhere in the article/book jumps to that location. The harder the user presses, the further in the story the system goes. Similarly, pressing hard on the bottom of a screen could bring up a dashboard. This gesture addresses the difficulty in swiping from the bottom of a device in many circumstances (like driving).

The gestures described can be used for multiple controls as described above and including (but not limited to) switching applications, going to a home screen, applying custom presets, going back, going forward, zooming, operating the camera (e.g., using side pressure input to make selfies and pictures easier), changing volume, and/or changing brightness.

Additionally, one or more of the surfaces of the device may be used as a pointing or typing input for the device (e.g., with fingers on the back and thumb on the front, the device enters a one-handed typing mode). And the gesture input signals generated (including pattern and pressure) may be combined with signals from other sensors in the device (e.g., motion sensors, acoustic sensors) to determine corresponding gestures (e.g., a hard grasp combined with rapid falling may indicate a drop or a hard grasp with rapid shaking may correspond to a specific control signal).

Figure 17:
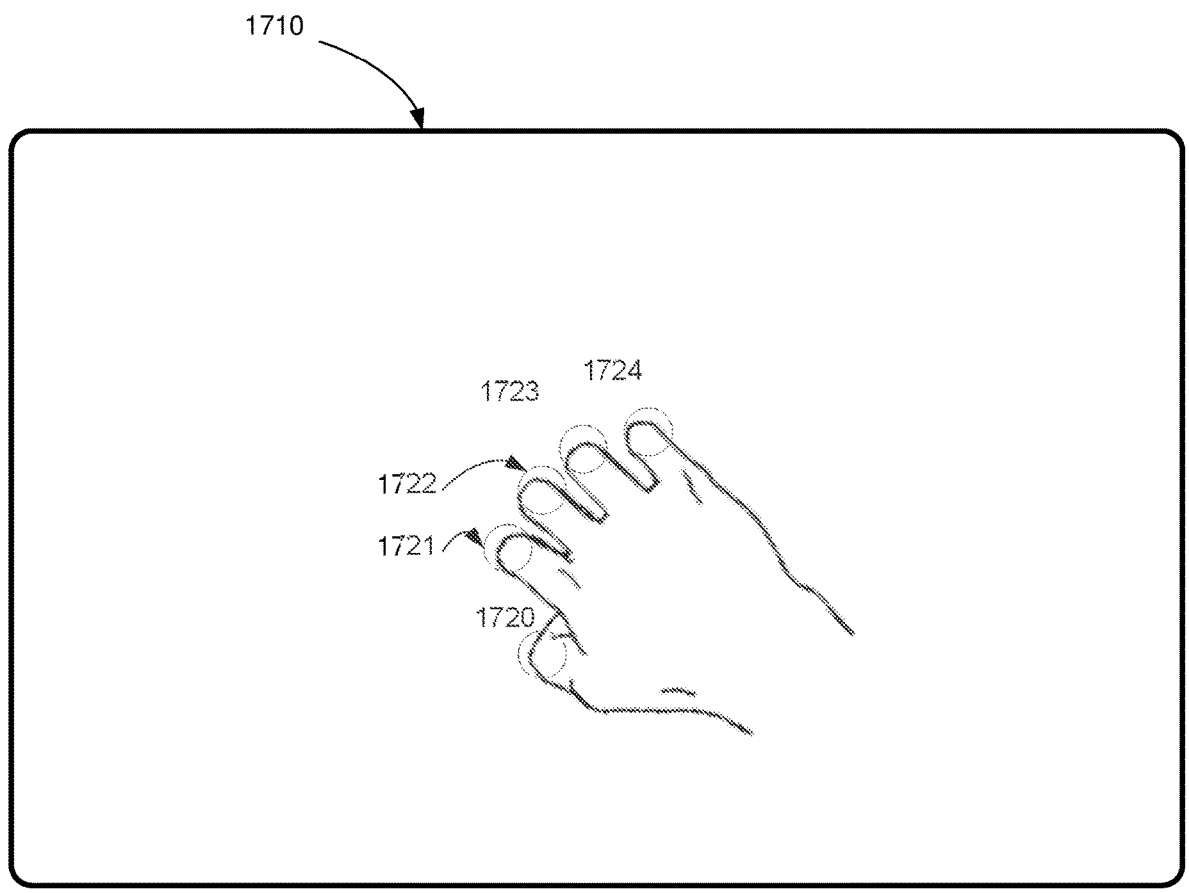
FIG. 17 illustrates a system using an exemplary interpolated variable impedance sensor array for gesture recognition.

In one example shown in FIG. 17, a user may rap on a handheld device 1710 with one or more knuckles (e.g., like knocking on a door). The one or more knuckles make contact 1720, 1721, 1722, 1723, 1724 with the touch sensor array. A knock is high force tap. The system uses the high force characteristics to distinguish knocking from other touches. In one example, the knocking gesture may be used to control a phone mounted in a car, for example with a navigation application. One such gesture could re-center a navigation screen with one or more knuckles or take the user to list of directions or let the user look ahead (e.g., at the next 15 minutes) by zooming appropriately.

Additionally, a tapping or pounding gesture could be used for other commands such as those used in unusual situations. For example, these gestures could be used to dial 911 or dispatch emergency response (e.g., dial 911 if the user knocks on the screen three times within a given time period or if the user knocks or pounds on the device repeatedly).

Another example is a kneading pattern of multiple fingers pushing in and out with translating horizontally or vertically on the sensor array. Similarly, a wave pattern of four fingers touching the sensor array and using rolling amount of pressure without translating horizontally or vertically on the sensor array. Further, pressure with two fingers may correspond to one command but pressing harder on one or the other may correspond to a different command. In another example, the combination of (1) the touch pattern (the size, shape, and number) of the one or more points in contact with the sensor array instantaneously and/or over time together with (2) the pressure at the one or more touch points instantaneously may be used to activate different layers used in programs or visual layers in the UI.

Additional examples gestures include moving a thumb in a circle to undo, redo and/or zoom in and out. Such gestures enable a user to do as much as possible on a handheld device with one hand. Further, as described above, patterns with force can be used for additional gestures such as (1) with little force, a regular touch is applied and (2) with pressure, the user's gestures like circle scrolling, or swiping are caused to do different things. Also, a deep click may be linked to scroll and/or pan. The system may also detect the torque in finger motion and use that as a gesture input. In one example, a user's wavering motion in the finger is used to modulate the response (e.g., waver up and down (north to south) to change scroll direction). And in one example, while an item is selected, a swirling motion with one or more points in contact with the device may be used to delete the selected item.

The following embodiments demonstrate uses of one or more variable impedance touch sensor arrays on non-planar and irregular surfaces. They include but are not limited to bodysuits, squeezable game controllers, computer mice, dials/knobs, headphones/earbuds, force sensing gloves, grip-based controls, grip posture or grip-strength detection for safety and teaching, wristband flex or wrist-flex detection, force-sensing robot skin, and squeezing to manipulate an object. In all embodiments, haptic, optical and auditory feedback can be added to provide additional feedback.

Additionally, the disclosed systems are used to recreate existing device interactions. For instance, the user may place his or her hand on the sensor array as if holding a mouse. The hand movements on the sensor may be used to move the cursor. A tap from the index finger may correspond to a left click, and a tap from the middle finger may correspond to a right click. Multiple fingers together could move the scroll wheel. Recreating existing devices can be accomplished with or without objects that recreate the shape of the existing device. The variable impedance touch sensor arrays can be located on the surface of the object, inside the object or on the surface/inside another object. For instance, a rubber hemisphere is moved on top of a variable impedance touch sensor array and the forces applied to the object are transmitted to the sensor array.

Figure 18:
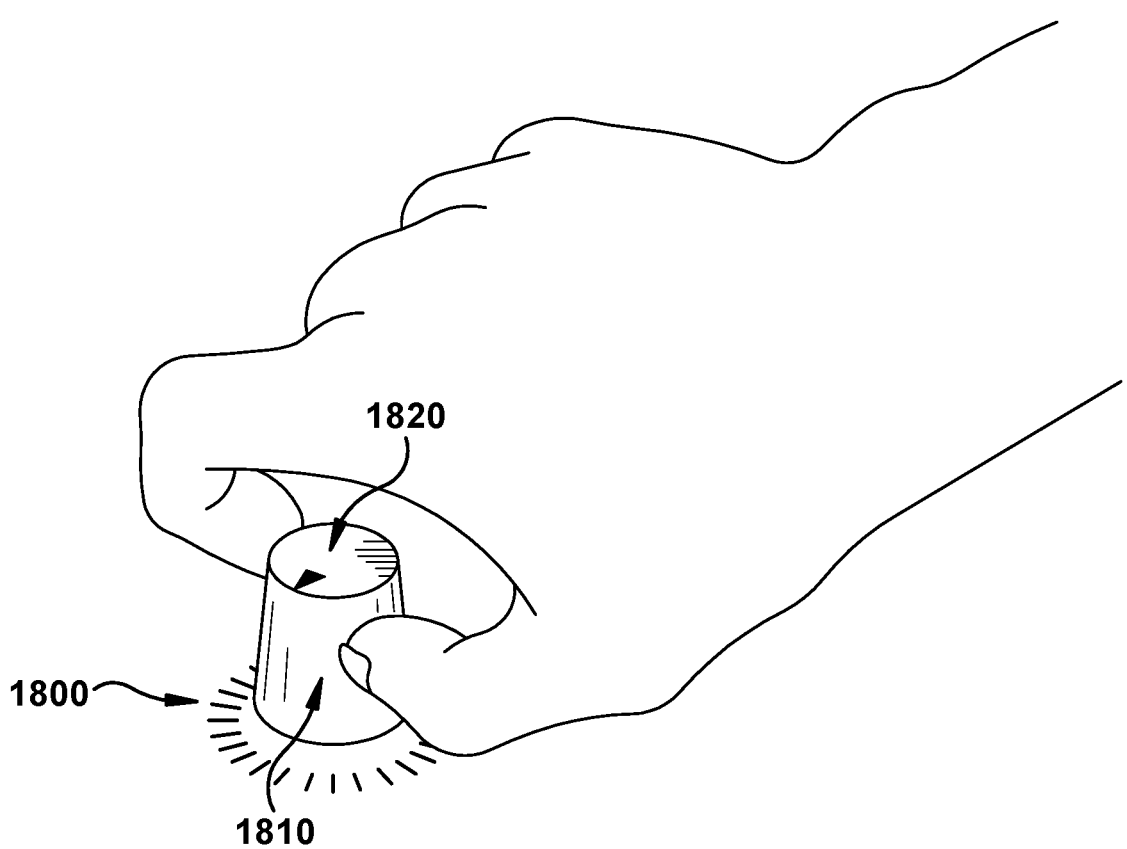
FIG. 18 illustrates a system using an exemplary interpolated variable impedance sensor array for gesture recognition.

As illustrated in FIG. 18, the interpolated variable impedance touch sensor arrays may be incorporated into controls such a dial or knob 1800. The arrays may be incorporated in part or all of the surfaces of the knob 1800. For example, the arrays may be incorporated in part or all of the sides 1810 and/or top 1820 of the knob 1800. As shown in FIG. 18, a user may grip, pinch, push, pull, or squeeze the knob 1800 in addition to rotating the knob 1800. The system detects the force and force pattern on the surfaces of the know 1810, 1820 with incorporated variable impedance touch sensor arrays. The system uses the force pattern as control signals to, for example, vary the magnitude of the change in the feature controlled by the knob. For example, if the knob 1800 controls volume, a rotation of the knob 1800 while squeezing the knob 1800 hard increases the volume faster than rotating the knob 1800 while squeezing the knob 1800 softly. Additionally, the system may use the force differential in the pressure applied to different sides of the knob 1800. Using the force differential, the system may use the force pattern so that the user can use the knob 1800 as a joystick type interface. Additionally, the system may recognize gestures and/or squeeze patterns on the knob 1800 and/or surfaces 1810, 1820 of the knob as described previously. For example, sliding fingers along the outside of the knob 1800 may control one function, and pressing and rotating the knob 1800 controls another function. The system may also use the force sensed on the knob 1800 as a control signal independent of rotation of the knob 1800. For example, merely grasping and squeezing the knob 1800 may control a function (e.g., change channels, move tracks, increase air temp etc.). In one embodiment, the knob 1800 also provides feedback to the user via optical elements (e.g., LEDs) and/or haptic elements.

Additionally, the interpolated variable impedance touch sensor arrays may be incorporated in various control devices such as a knob, lever, switch, or other protrusion. The system detects if the user is ready or preparing to activate the control device through the force applied to the control device. In one example, a user rests his or her finger on a light switch before actually flipping the switch. The mechanical circuit of the switch, however, does not know that the user is preparing to activate the switch (even if the user is gently or slowly increasing the force applied to the switch in the process of activation) until the circuit is actually completed. Using the touch and force-awareness provided by the interpolated variable impedance touch sensor arrays allows the system take preparatory or anticipatory actions before the mechanical circuit has been engaged or disengaged. The interpolated variable impedance touch sensor arrays may be incorporated into remote controls and other devices with protrusions to offer novel methods of interactions including pressing harder to change channels quickly or prevent accidental presses when a controller is dropped or compressed.

Figure 19:
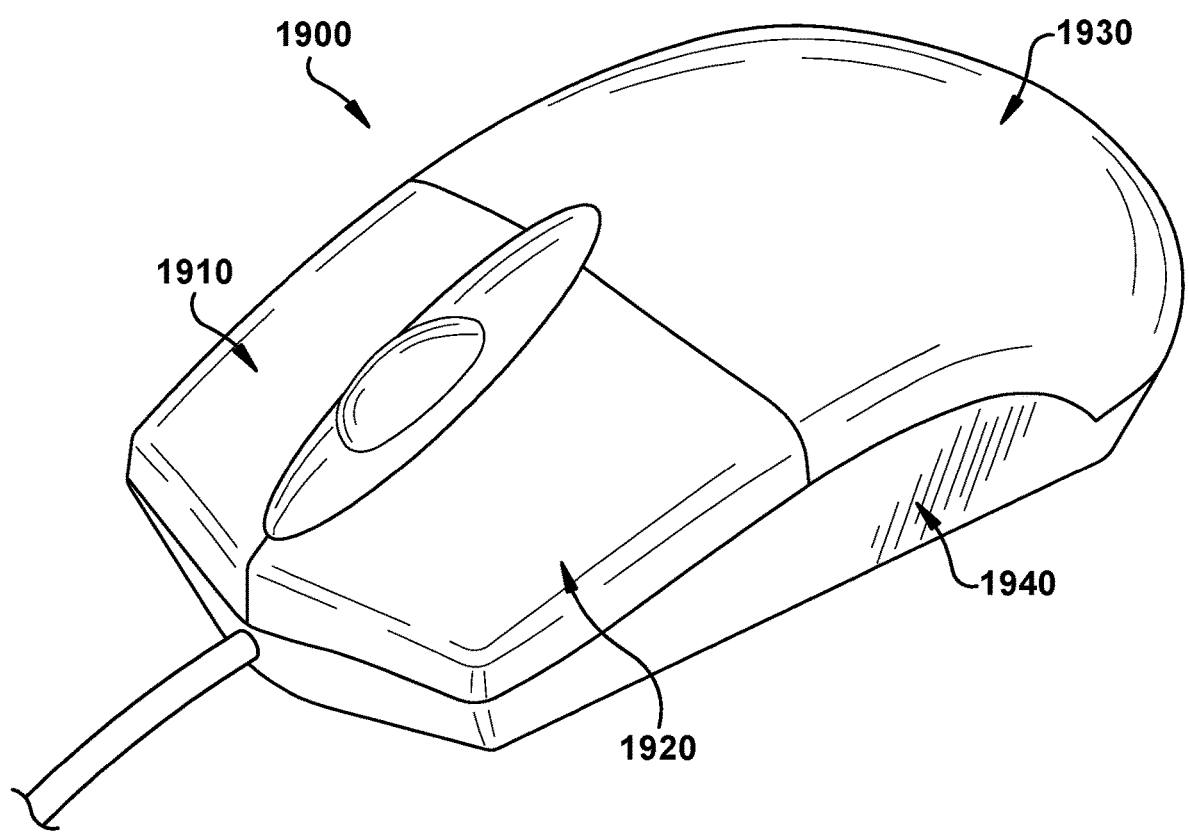
FIG. 19 illustrates a system using an exemplary interpolated variable impedance sensor array for gesture recognition.

As shown in FIG. 19, the interpolated variable impedance touch sensor arrays may be incorporated in the surface of a computer mouse 1900 or another computer interface device. The arrays may be incorporated into one or more surfaces of the mouse 1900 including a right button 1910, a left button 1920, the aft surface 1930, and/or the lateral surfaces 1940 of the mouse 1900. The system may use the pressure pattern on one or more of the surfaces of the mouse 1900 and may use the differential pressure pattern between two or more surfaces. The input from the pressure patterns can be used for various application controls and/or shortcuts. In one example, using a squeeze force on the mouse 1900 slows down motion (because people tend to squeeze when they want finer control). Additionally, the system can measure squeeze or force distributions on a mouse to determine a user's anxiety level and/or detect who is using the device. In one embodiment, the user's grip pattern is used to activate and/or unlock features of an associated computing device. The side of the palm (below pinky, towards wrist) may be used to activate a control surface of the mouse 1900. For example, pressure from that region could be used as a hold/select command while a finger taps on another region of the mouse 1900 to complete an operation. In other embodiments, the input device could have non-standard layouts or have one continuous surface. With mice, for instance, the mouse could have more or less areas or have one continuous surface that uses force in areas to provide input.

The arrays may be incorporated in one or more surface of other computer interface devices such as keyboards. The interface devices may also include feedback devices such as optical or haptic feedback to provide feedback to a user based on the user's force inputs using the arrays.

Figure 20B:
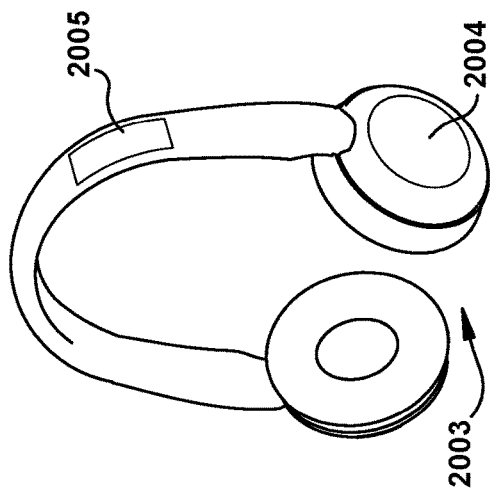
FIG. 20b illustrates a system using an exemplary interpolated variable impedance sensor array for gesture recognition.
Figure 20A:
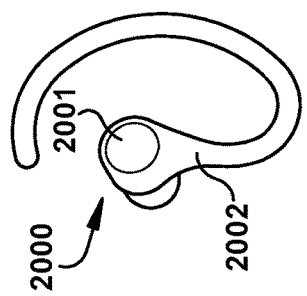
FIG. 20a illustrates a system using an exemplary interpolated variable impedance sensor array for gesture recognition.

The interpolated variable impedance touch sensor arrays may be incorporated into the surface of other devices to provide control signals. For example, the arrays may be incorporated into a part or all of the surface of audio earphones (over ear and/or in ear). In FIG. 20a, the variable impedance touch sensor array is applied to an earphone 2000 on the ear buds 2001, and housing 2002. In FIG. 20b, the variable impedance touch sensor array is applied to headphones 2003 on the over ear speakers 2004, and the headband 2005. In one example, the processor (in the earphone or coupled device) receives pressure information from the arrays and uses that information to control a function of the earphones. For example, a touch to the earphone may activate a menu and a harder or longer touch may activate another menu (or another level of the first menu). Additionally, the force patter applied to the earphone may be used to control the volume or other audio features (bass, treble, equalizer) and/or functions of the coupled device (e.g., answer the phone, engage an application). In another example, swiping on the earphone could change tracks or menu options. Twisting the headphone or earphone could switch selected items or scroll through available options. Squeezing the headphone or earphone could be used to manipulate a menu, like playing audio, muting and other controls. The input from the force pattern applied to the earphone may be combined with other control data including, for example, voice input, to control the earphones and/or coupled device. For example, a pressure enabled menu may be paired with a voice assistant to navigate the menu. Also, the system may give audio or visual instruction as pressure is applied on how to control the system via pressure inputs. The interpolated variable impedance touch sensor can be incorporated onto the surface of the object, under the surface of the object, or on another object that transfers detection to the interpolated variable impedance touch sensor.

Figure 21:
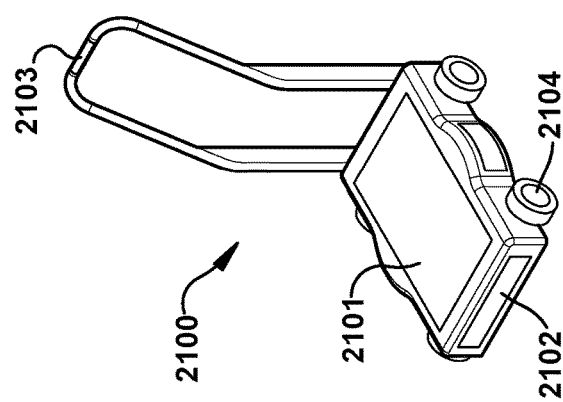
FIG. 21 illustrates a system using an exemplary interpolated variable impedance sensor array for gesture recognition.

Additional devices in which the interpolated variable impedance touch sensor arrays may be incorporated include devices that operate autonomously or semi-autonomously such as vacuum cleaners and lawn equipment. In FIG. 21, the interpolated variable impedance touch sensor array is applied to a semi-autonomous device 2100 on the housing

2101, the bumper 2102, the hand grip 2103, and the wheels 2104. The force pattern applied to a surface of the equipment containing the arrays is used to guide the equipment. In one example, the interpolated variable impedance touch sensor arrays are used to provide sensing for the outside of devices that operate autonomously or semi-autonomously to provide information about the environment. In one example, the interpolated variable impedance touch sensor arrays are incorporated into wheels and bumpers to detect the material or conditions on which the device is moving. The arrays may also be incorporated into seating to allow control of the seating by the force pattern of the person seated in the seat. For example, the user may control the seat by leaning forward or backward or to the sides. Additionally, the system may use a force pattern to determine the corresponding response (e.g., adjust automatically to reduce a high-pressure area or to increase pressure on a given area). Similar systems may be used for a user interface to steer vehicles or heavy machinery.

Figure 22:
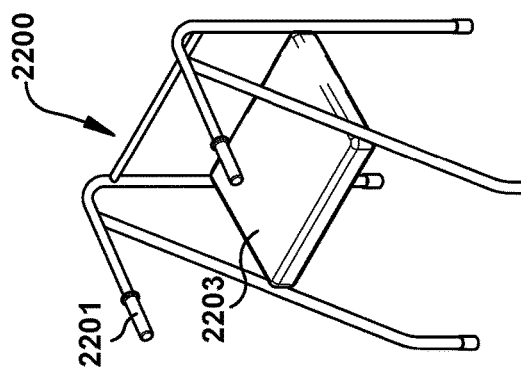
FIG. 22 illustrates a system using an exemplary interpolated variable impedance sensor array for gesture recognition.

In another embodiment, interpolated variable impedance touch sensor arrays are incorporated in one or more surface of walking apparatus such as a cane or walker. In FIG. 22 the interpolated variable impedance touch sensor array is applied to a walker 2200 on the grip 2201 the legs 2202 and sitting area 2203. The arrays determine the pressure pattern of the walking apparatus with the ground and/or with the grip of the user. The system uses the pressure patterns to determine the user's grip and the state of the interface between the walking device and the floor. In one example, the system uses the pressure pattern data to determine that the walking device is losing or has lost contact with the floor (e.g., the walking device is slipping) and alerts the user and or contacts emergency assistance. The interpolated variable impedance touch sensor array can also provide information that can inform how the walker, cane or other device is being used and how to improve use of the device.

Figure 23A:
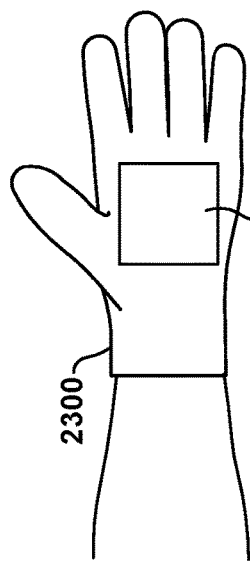
FIG. 23a illustrates a system using an exemplary interpolated variable impedance sensor array for gesture recognition.
Figure 23B:
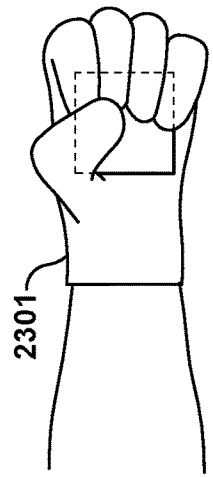
FIG. 23b illustrates a system using an exemplary interpolated variable impedance sensor array for gesture recognition.
Figure 24:
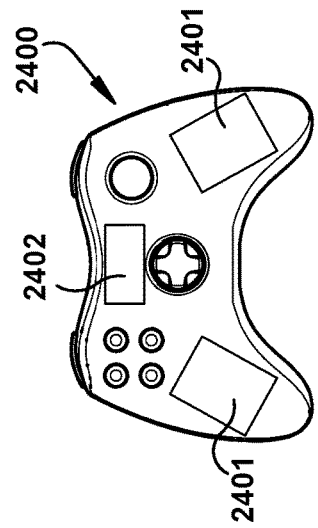
FIG. 24 illustrates a system using an exemplary interpolated variable impedance sensor array for gesture recognition.

The interpolated variable impedance touch sensor arrays may be incorporated in other devices such as handwarmers (that heat up when the user squeezes it or stays cool when the user does not), video game controllers (for example, the two large handles of most game controllers), and power tools and appliances. In FIG. 23, the interpolated variable impedance touch sensor array is applied to a glove 2300 in the palm 2302 so that when the glove is squeezed 2301, warmth is applied. In FIG. 24, the interpolated variable impedance touch sensor array is applied to a game controller 2400 on the grips 2401 and the central area 2402.

In the example in which the arrays are incorporated in tools or appliances, the force pattern may control the speed of the appliance or tool. Additionally, the force pattern may be used for safety. In this example, the system powers on, powers off, and/or controls the speed of the appliance or tool based on the pressure pattern applied to the one or more arrays. The system may prevent the tool or appliance from powering on or exceeding a setting if the user is not holding the tool or appliance properly. The interpolated variable impedance touch sensor arrays can also provide information about how the tool or appliance is being used in order to improve the use of the device or provide feedback to the user. In FIG. 25*a*, the interpolated variable impedance touch sensor array is applied to a hammer 2500 on the grip 2501. In FIG. 26*b*, the interpolated variable impedance touch sensor array is applied to a circular table saw 2502 on the handle 2503 and the table 2504.

Additionally, the system may require a degree of contact (e.g., full hands to be in contact) to activate a tool (like a table saw). And the system can determine if the user's hand corresponds in size an adult via the pressure pattern to prevent children from using dangerous tools.

In one embodiment, the system uses grip strength and/or pattern to control the speed or torque of the motor on the tool or appliance. In that way, for instance, if the user squeezes lightly, the tool speed is limited, and the user cannot do too much damage. Further, the system may be programmed to reduce speed and/or shut the tool or appliance off is an upper grip strength or force pattern is reached. This is a safety precaution for the case when a user tenses up in a stressful situation using the tool or appliance. The system may also measure the vibration or torque forces being applied to a user's hand via the arrays and use this for safety to avoid hurting the operator. The interpolated variable impedance touch sensor arrays can also be applied to moving objects like shopping carts, wheelchairs, and gurneys that could require contact before the wheels can move.

Similar array systems may be incorporated in firearms to provide additional safety and/or to prevent unauthorized use. The interpolated variable impedance touch sensor array can be used to identify the user of a firearm or other device to prevent unauthorized use including children. And the array systems may be applied to recreational tools such as a bat or golf club. The system sues the pressure pattern to analyze and correct swing and/or grip. In FIG. 26, the interpolated variable impedance touch sensor array is applied to the grip 2601 of a firearm 2602. In FIG. 27, the interpolated variable impedance touch sensor array is applied to a golf club 2700 grip 2701 and head 2702.

In one embodiment, the system includes actuators that change the size and/or shape of an object with embedded interpolated variable impedance touch sensor arrays. In this example, squeezing the surface could send data to actuators to change the shape of the surface so the device conforms to the user's hand. Additionally, a user could squeeze the object into a shape that looks like something. The control signal is determined from the pressure (force) pattern associated with the shape of the device. The system changes its behaviors based on the shape and corresponding force pattern. For thin devices (e.g., flexible devices), the system may incorporate additional sensors like capacitors to determine the face on which the force is being applied (e.g., to distinguish whether a force is being applied to the front surface or the back surface). A capacitive touch sensor could tell the device whether the user is pressing on the front or the back, and the force sensor will measure the amount and pattern of the force being applied. In FIG. 28, an input device 2800 uses the interpolated variable impedance touch sensor array 2801 within two layers of flexible substrate 2802.

In another embodiment, the interpolated variable impedance touch sensor arrays are incorporated into one or more wall of a vessel that contains a pressure transferring medium such as a thick liquid. A user puts his or her hand into the vessel and executes motions or gestures with the hand. The system determines the force pattern transferred to the walls of the vessel through the transferring medium and uses the force pattern as a control input. In other embodiments, the interpolated variable impedance touch sensor arrays can be used to detect forces indirectly from forces applied to gasses, liquids, solids and combinations of these states. In FIG. 29, the interpolated variable impedance touch sensor array is applied to the sides 2901 and base 2902 of a box 2900 with a thick liquid 2903.

In another embodiment, the interpolated variable impedance touch sensor arrays are incorporated into skins or covers for robots or machinery. The skins or covers may be replaceable. Systems using skins or covers with the arrays may use the force patterns generated to control the system (e.g., guidance) and/or detect and prevent damage. The systems can use the force pattern data to provide active feedback to the robot or machinery. In FIG. 30, the interpolated variable impedance touch sensor array is applied to a robot 3000 on its base/feet/wheels 3001, on the main body 3004, any joints 3003 and any tools used to manipulate objects 3002.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for receiving an adjustment gesture formed on or about a plurality of sensor panels on a plurality of faces of a device comprising:
   detecting two or more touches at a first time at the sensor panels;
   determining that the two or more touches are arranged in a pattern corresponding to a predetermined gesture;
   determining a relative pressure between the two or more touches;
   associating the predetermined gesture with a user interface (UI) element, the UI element accepting an adjustment input based on the relative pressure;
   determining that the pattern and the relative pressure correspond to a predetermined see-saw gesture; and
   providing an input to the UI element based on the predetermined gesture and the relative pressure.

2. The method of claim 1 wherein each of the plurality of sensor panels comprise:
   a plurality of physical variable impedance array (VIA) columns connected by interlinked impedance columns;
   a plurality of physical VIA rows connected by interlinked impedance rows;
   a plurality of column drive sources connected to the interlinked impedance columns and to the plurality of physical VIA columns through the interlinked impedance columns;
   a plurality of row sense sinks connected to the interlinked impedance rows and to the plurality of physical VIA rows through the interlinked impedance rows; and
   a processor configured to interpolate a location of the gesture in the physical VIA columns and physical VIA rows from an electrical signal from the plurality of column drive sources sensed at the plurality of row sense sinks.

3. The method of claim 2 further comprising determining a pressure response for the gesture from the electrical signal from the plurality of column drive sources sensed at the plurality of row sense sinks.

4. The method of claim 2 further comprising providing adjustment information to a coupled device based on the gesture location and pressure response.

5. The method of claim 2 further comprising determining a relative orientation of the two or more touches from the electrical signal from the plurality of column drive sources sensed at the plurality of row sense sinks and a relative pressure applied at the two or more touches from the electrical signal from the plurality of column drive sources sensed at the plurality of row sense sinks.

6. The method of claim 2 further comprising determining a continuous pressure change at one of the two or more touches from the electrical signal from the plurality of column drive sources sensed at the plurality of row sense sinks and to cause the UI element to provide visual feedback based on the continuous pressure at the one or more points.

7. The method of claim 2 further comprising determining a pressure pattern over time from the electrical signal from the plurality of column drive sources sensed at the plurality of row sense sinks.

8. A method for receiving an adjustment gesture formed on or about a plurality of sensor arrays on a plurality of faces of a device comprising:
   determining a touch pattern of one or more points in contact with the plurality of sensor arrays;
   determining a relative pressure between the one or more touch points over time;
   determining a pressure response pattern at the one or more touch points over time; and
   determining a predetermined gesture corresponding to the touch pattern, the relative pressure, and the pressure response pattern, resulting in a determined gesture, wherein the predetermined gesture comprises a predetermined see-saw gesture.

9. The method of claim 8 wherein:
   the plurality of faces includes a watch face and a wristband of the watch, and
   a first of the plurality of sensor arrays is incorporated in the watch face and a second of the plurality of sensor arrays is incorporated in the watch wristband.

10. The method of claim 9 further comprising based on the determined gesture, controlling functions of the watch.

11. The method of claim 9 further comprising based on the determined gesture, controlling functions of a device communicatively coupled to the watch.

12. The method of claim 9 further comprising based on the determined gesture, detecting a wrist flex of a wearer of the watch.

13. The method of claim 8 wherein the plurality of faces comprise sides of a vessel containing a pressure transferring medium.

14. The method of claim 8 wherein at least one of the plurality of faces are incorporated into covers for machinery.

15. The method of claim 8 further comprising detecting grip pressure at the plurality of faces.

16. A system comprising:
   a plurality of sensor panels on a plurality of faces of a device; and
   a processor communicatively coupled to the plurality of sensor panels, wherein the processor is configured to perform operations comprising:
      detecting two or more touches at a first time at the sensor panels,
      determining that the two or more touches at the first time are arranged in a pattern;
      determining a relative pressure between the two or more touches;
      determining that the pattern and the relative pressure corresponds to a predetermined gesture, resulting in a determined gesture, wherein the predetermined gesture comprises a predetermined see-saw gesture.

17. The system of claim 16 wherein the processor is further configured to:
   associate the determined gesture with a user interface (UI) element, and
   based on the determined gesture, provide an input to the UI element based on the determined gesture.

18. The system of claim 16 wherein ones of the plurality of sensor panels comprise:
   a plurality of physical variable impedance array (VIA) columns connected by interlinked impedance columns;
   a plurality of physical VIA rows connected by interlinked impedance rows;
   a plurality of column drive sources connected to the interlinked impedance columns and to the plurality of physical VIA columns through the interlinked impedance columns; and
   a plurality of row sense sinks connected to the interlinked impedance rows and to the plurality of physical VIA rows through the interlinked impedance rows, wherein the processor is further configured to interpolate a location of the gesture in the physical VIA columns and physical VIA rows from an electrical signal from the plurality of column drive sources sensed at the plurality of row sense sinks.

19. The system of claim 18 wherein the processor is further configured to determine a relative orientation of the two or more touches from the electrical signal from the plurality of column drive sources sensed at the plurality of row sense sinks and a relative pressure applied at the two or more touches from the electrical signal from the plurality of column drive sources sensed at the plurality of row sense sinks.

* * * * *